United States Patent
Tajima et al.

(10) Patent No.: US 12,118,150 B2
(45) Date of Patent: Oct. 15, 2024

(54) CONTROL DEVICE, FORCE SENSE PRESENTATION APPARATUS, AND CONTROL METHOD

(71) Applicant: SONY GROUP CORPORATION, Tokyo (JP)

(72) Inventors: Daisuke Tajima, Tokyo (JP); Yohei Fukuma, Chiba (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 204 days.

(21) Appl. No.: 17/764,739

(22) PCT Filed: Oct. 23, 2020

(86) PCT No.: PCT/JP2020/039960
§ 371 (c)(1),
(2) Date: Mar. 29, 2022

(87) PCT Pub. No.: WO2021/095493
PCT Pub. Date: May 20, 2021

(65) Prior Publication Data
US 2022/0374083 A1      Nov. 24, 2022

(30) Foreign Application Priority Data

Nov. 13, 2019   (JP) ................. 2019-205520

(51) Int. Cl.
*G06F 3/01*      (2006.01)
(52) U.S. Cl.
CPC .............. *G06F 3/016* (2013.01); *G06F 3/014* (2013.01)

(58) Field of Classification Search
CPC .......... G06F 3/016; G06F 3/014; G06F 3/011
See application file for complete search history.

(56) References Cited

U.S. PATENT DOCUMENTS

2016/0259408 A1\*   9/2016   Messingher .......... G06T 19/006
2017/0371416 A1    12/2017   Zeitler

FOREIGN PATENT DOCUMENTS

| JP | 2000-099240 A | 4/2000 |
| JP | 2000-311047 A | 11/2000 |
| JP | 2001-166676 A | 6/2001 |

(Continued)

*Primary Examiner* — Daryl C Pope
(74) *Attorney, Agent, or Firm* — Paratus Law Group, PLLC

(57) ABSTRACT

There is provided a control device according to the present technology to improve an accuracy of force sense presentation while preventing hindrance to a free motion of a target part when a user does not touch a virtual object. The control device includes a control unit that controls a force sense presentation apparatus, which includes a first member that is displaced mechanically in conjunction with a motion of a target part of a user, a second member that is displaceable in a direction of coming into contact with or separating from the first member, and a drive part that drives the second member and performs force sense presentation with respect to the target part, such that a driving state of the second member is changed according to a positional relationship between a virtual object and the target part in a virtual space in which the virtual object is arranged.

21 Claims, 17 Drawing Sheets

(56) References Cited

FOREIGN PATENT DOCUMENTS

| JP | 2003-316493 | A | 11/2003 |
| JP | 2011-235780 | A | 11/2011 |
| WO | WO-99021478 | A1 | 5/1999 |
| WO | WO 2018/020794 | A1 | 2/2018 |

\* cited by examiner

FIG. 7
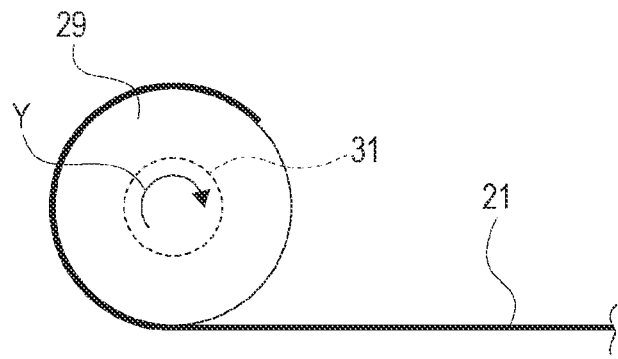
FIG. 8
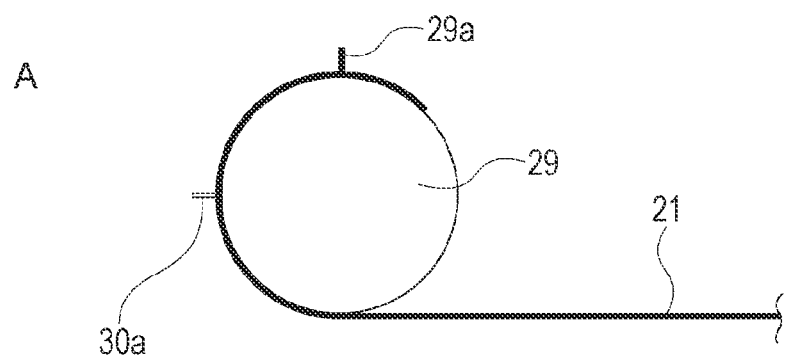
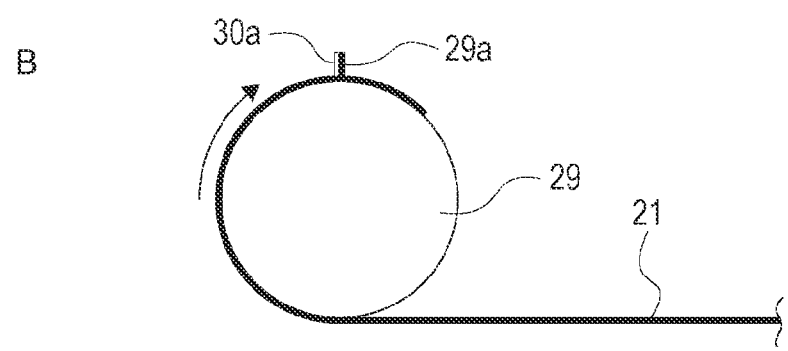

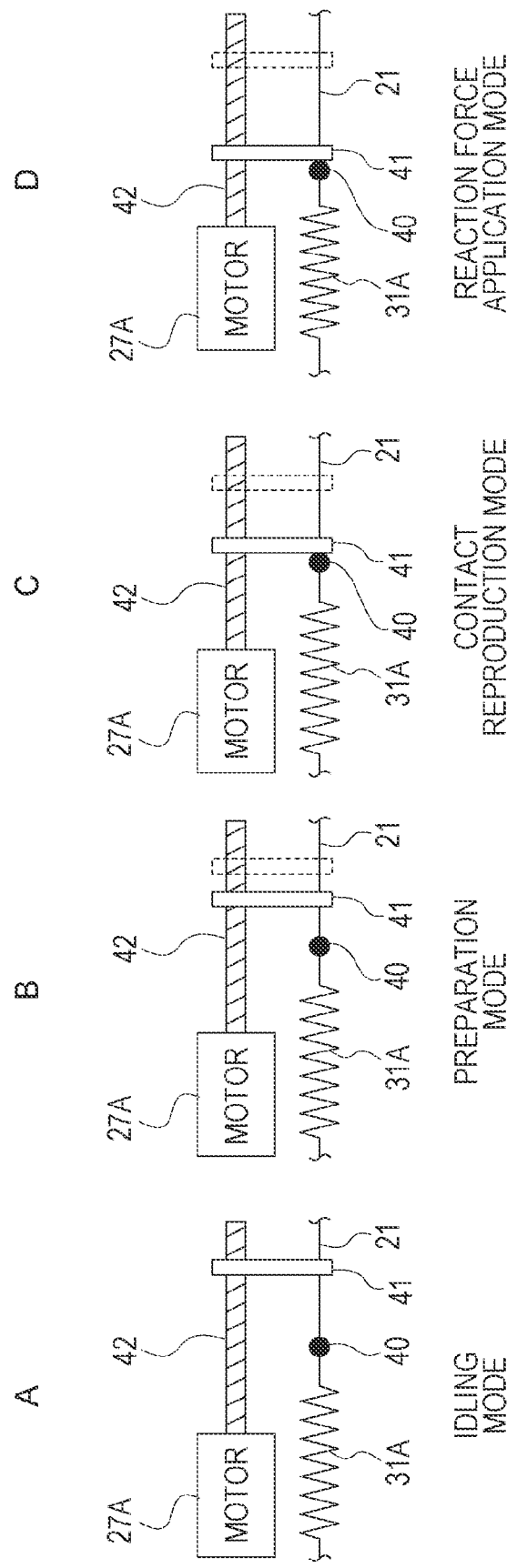

CONTROL DEVICE, FORCE SENSE PRESENTATION APPARATUS, AND CONTROL METHOD

CROSS REFERENCE TO PRIOR APPLICATION

This application is a National Stage Patent Application of PCT International Patent Application No. PCT/JP2020/039960 (filed on Oct. 23, 2020) under 35 U.S.C. § 371, which claims priority to Japanese Patent Application No. 2019-205520 (filed on Nov. 13, 2019), which are all hereby incorporated by reference in their entirety.

TECHNICAL FIELD

The present technology relates to a technical field of a control device that controls a force sense presentation apparatus that presents a force sense at the time of touching an object or the like, the force sense presentation apparatus, and a method of controlling the force sense presentation apparatus.

BACKGROUND ART

A virtual reality (VR) technology for allowing a user to perceive an artificially constructed virtual space has been put into practical use.

As the VR technology, a technology which uses a force sense presentation apparatus to perceive a sense as a force sense as if the user touches or holds a virtual object is known in addition to a technology which uses an image to visually perceive a virtual space.

As the force sense presentation apparatus, for example, a glove type or the like which is worn on a finger of a user as disclosed in Patent Document 1 below is known.

In the force sense presentation apparatus described in Patent Document 1, a wire in which one end is fixed to a ring-shaped member which is fixed to a joint part of a finger by means of a band or the like is caused to creep along the finger, and a force sense is expressed by a brake mechanism which prevents that the wire is unwound to a fingertip side.

CITATION LIST

Patent Document

Patent Document 1: Japanese Patent Application Laid-Open No. 2000-99240

SUMMARY OF THE INVENTION

Problems to be Solved by the Invention

However, in Patent Document 1 described above, a configuration is made such that the expression of the force sense is realized by the brake mechanism of the wire, that is, the mechanism for braking the wire to be unwound in a fingertip direction, and thus a sensation of touching an object can be expressed, but a reaction force from the object when the touched object is pushed in (a sense that the finger is pushed back) cannot be expressed. That is, the accuracy of force sense presentation is lacking in that a force sense to be actually obtained cannot be expressed.

Furthermore, as the force sense presentation apparatus, for example, when the force sense presentation apparatus is worn on a target part of force sense presentation such as a finger, it is important not to hinder free motion of the target part in order to enhance the user's sense of immersion in the virtual space.

The present technology has been made in view of the circumstances described above, and an object thereof is to improve an accuracy of force sense presentation while preventing hindrance to a free motion of a target part when a user does not touch a virtual object.

Solutions to Problems

A control device according to the present technology includes: a control unit that controls a force sense presentation apparatus, which includes a first member that is displaced mechanically in conjunction with a motion of a target part of a user, a second member that is displaceable in a direction of coming into contact with or separating from the first member, and a drive part that drives the second member and performs force sense presentation with respect to the target part, such that a driving state of the second member is changed according to a positional relationship between a virtual object and the target part in a virtual space in which the virtual object is arranged.

By changing the driving state of the second member according to the positional relationship between the virtual object and the target part as described above, for example, when the target part approaches and touches the virtual object, the second member can be brought into contact with the first member to allow the user to perceive a sensation of touching the virtual object, or in a state where the target part is sufficiently far from the virtual object, the second member can be driven such that a clearance between the second member and the first member increases, thereby preventing that the second member comes into contact with the first member to hinder the free motion of the target part. Furthermore, when the driving state of the second member is changed according to the positional relationship between the virtual object and the target part as described above, a reaction force from the virtual object side can be applied to the first member so that it is possible to perceive not only the sensation of touching the object but also the reaction force of the object which pushes back the target part from the touched object.

In the control device according to the present technology described above, it is conceivable that the control unit causes the driving state to change according to a separation distance between the virtual object and the target part.

Therefore, it is not necessary to estimate the magnitude of the force applied to the virtual object by the target part in expressing the sensation of touching the object or the reaction force from the object.

In the control device according to the present technology described above, it is conceivable that the control unit controls the second member to be continuously positioned at a predetermined position separated from the first member in a case where the separation distance is larger than a threshold.

Therefore, in a state where the target part is sufficiently separated from the virtual object in the virtual space, the second member can be continuously positioned at the retraction position sufficiently separated from the first member. That is, it is possible to prevent that the first member which is displaced in conjunction with the target part comes into contact with the second member to hinder the motion of the target part.

In the control device according to the present technology described above, it is conceivable that the control unit estimates presence or absence of contact of the target part with the virtual object on the basis of the separation distance, and controls the second member to be brought into contact with the first member in a case where it is estimated that the contact has been made.

Therefore, in response to the estimation that the target part has come into contact with the virtual object in the virtual space, a drag expressing the contact with the object can be applied to the target part.

In the control device according to the present technology described above, it is conceivable that the control unit controls the second member to be driven such that the second member follows the first member at a constant interval until it is estimated that the contact has been made after the separation distance becomes equal to or less than the threshold.

Therefore, in a case where the target part approaches the virtual object in the virtual space and the contact with the virtual object is predicted, the position of the second member can be kept close to the first member.

In the control device according to the present technology described above, it is conceivable that the control unit controls the second member to be driven to apply a reaction force to the first member in a case where the separation distance decreases from a time point at which it is estimated that the contact has been made.

Therefore, it is possible to express the reaction force from the object when the touched object is further pushed.

In the control device according to the present technology described above, it is conceivable that the control unit controls an application characteristic of the reaction force to the first member to be changed according to a type of the virtual object.

Therefore, the application characteristic of the reaction force to the target part when the touched object is further pushed is changed according to the type of the virtual object.

Furthermore, a force sense presentation apparatus according to the present technology includes: a first member that is displaced mechanically in conjunction with a motion of a target part of a user; a second member that is displaceable in a direction of coming into contact with or separating from the first member; and a drive part that drives the second member. A driving state of the second member by the drive part changes according to a positional relationship between a virtual object and the target part in a virtual space in which the virtual object is arranged.

By changing the driving state of the second member according to the positional relationship between the virtual object and the target part as described above, for example, when the target part approaches and touches the virtual object, the second member can be brought into contact with the first member to allow the user to perceive a sensation of touching the virtual object, or in a state where the target part is sufficiently far from the virtual object, the second member can be driven such that a clearance between the second member and the first member increases, thereby preventing that the second member comes into contact with the first member to hinder the free motion of the target part. Furthermore, when the driving state of the second member is changed according to the positional relationship between the virtual object and the target part as described above, a reaction force from the virtual object side can be applied to the first member so that it is possible to perceive not only the sensation of touching the object but also the reaction force of the object which pushes back the target part from the touched object.

In the force sense presentation apparatus according to the present technology described above, it is conceivable that the driving state changes according to a separation distance between the virtual object and the target part.

Therefore, it is not necessary to estimate the magnitude of the force applied to the virtual object by the target part in expressing the sensation of touching the object or the reaction force from the object.

In the force sense presentation apparatus according to the present technology described above, it is conceivable that the drive part continuously positions the second member at a predetermined position separated from the first member in a case where the separation distance is larger than a threshold.

Therefore, in a state where the target part is sufficiently separated from the virtual object in the virtual space, the second member can be continuously positioned at the predetermined retraction position sufficiently separated from the first member. That is, it is possible to prevent that the first member which is displaced in conjunction with the target part comes into contact with the second member to hinder the motion of the target part.

In the force sense presentation apparatus according to the present technology described above, it is conceivable that the drive part brings the second member into contact with the first member in a case where it is estimated on the basis of the separation distance that contact of the target part with the virtual object has been made.

Therefore, in response to the estimation that the target part has come into contact with the virtual object in the virtual space, a drag expressing the contact with the object can be applied to the target part.

In the force sense presentation apparatus according to the present technology described above, it is conceivable that the drive part drives the second member such that the second member follows the first member at a constant interval until it is estimated that the contact has been made after the separation distance becomes equal to or less than the threshold.

Therefore, in a case where the target part approaches the virtual object in the virtual space and the contact with the virtual object is predicted, the position of the second member can be kept close to the first member.

In the force sense presentation apparatus according to the present technology described above, it is conceivable that the drive part drives the second member to apply a reaction force to the first member in a case where the separation distance decreases from a time point at which it is estimated that the contact has been made.

Therefore, it is possible to express the reaction force from the object when the touched object is further pushed.

In the force sense presentation apparatus according to the present technology described above, it is conceivable that the drive part changes an application characteristic of the reaction force to the first member according to a type of the virtual object.

Therefore, the application characteristic of the reaction force to the target part when the touched object is further pushed is changed according to the type of the virtual object.

In the force sense presentation apparatus according to the present technology described above, it is conceivable that the target part is a finger of the user.

Therefore, with the finger of the user as a target, the drag or the reaction force from the virtual object can be applied according to the positional relationship with the virtual object.

In the force sense presentation apparatus according to the present technology described above, it is conceivable that the force sense presentation apparatus includes: a wire that is interlocked with a motion of the target part, and the first member is a member that is mechanically interlocked with the wire.

Therefore, in a case where the second member comes into contact with the first member or applies the reaction force to the first member, the drag or the reaction force is applied to the target part via the wire. With such a wire-type force sense presentation apparatus, members to be arranged on the target part such as a finger in the force sense presentation can be only a locking unit that locks one end of the wire and a guide unit that allows the wire to creep along the target part.

In the force sense presentation apparatus according to the present technology described above, it is conceivable that the target part is a finger of the user, and the wire is arranged along a back of the finger.

Therefore, when the second member is brought into contact with the first member to apply a force, it is possible to generate a force in a direction in which the finger is warped to the back side.

In the force sense presentation apparatus according to the present technology described above, it is conceivable that the drive part is arranged on a fingertip side or an arm side of a wrist of the user.

Therefore, the drive part is arranged not to straddle the wrist of the user.

In the force sense presentation apparatus according to the present technology described above, it is conceivable that the drive part stops application of a reaction force of the second member to the first member in a case where a driving torque of the second member reaches an upper limit value.

Therefore, it is possible to prevent that an excessive load is applied to the joint part of the user for moving the target part or the drive mechanism portion of the second member.

In the force sense presentation apparatus according to the present technology described above, it is conceivable that the force sense presentation apparatus includes: a wire that is interlocked with a motion of the target part, the first member is a member that is mechanically interlocked with the wire, and a pull-in amount of the wire does not exceed a predetermined amount.

Therefore, it is possible to restrict the pull-in amount of the wire not to exceed a movable range of the joint part of the user for moving the target part or a movable range of the drive mechanism portion of the second member.

Furthermore, a control method according to the present technology is a control method of a force sense presentation apparatus that includes a first member that is displaced mechanically in conjunction with a motion of a target part of a user, a second member that is displaceable in a direction of coming into contact with or separating from the first member, and a drive part that drives the second member and performs force sense presentation with respect to the target part. The method includes: causing a driving state of the second member to change according to a positional relationship between a virtual object and the target part in a virtual space in which the virtual object is arranged.

Also with such a control method, the effects similar to those of the control device and the force sense presentation apparatus according to the present technology described above can be obtained.

BRIEF DESCRIPTION OF DRAWINGS

FIG. 7 is an explanatory diagram of an urging direction of an urging unit included in the force sense presentation apparatus according to the embodiment.

FIG. 8 is an operation explanatory diagram of the force sense presentation apparatus according to the embodiment.

FIG. 19 is an explanatory diagram of each control mode in the case of using the linear motion type and the wire control part.

MODE FOR CARRYING OUT THE INVENTION

Hereinafter, an embodiment according to the present technology will be described in the following order with reference to the accompanying drawings.

<1. Outline of VR system as embodiment>
<2. Configuration example of force sense presentation apparatus>
<3. Configuration example of control device>
<4. Control method as embodiment>
<5. Processing procedure>
<6. Modification>
<7. Program and storage medium>
<8. Summary of embodiment>
<9. Present technology>

1. Outline of VR System as Embodiment

Figure 1:
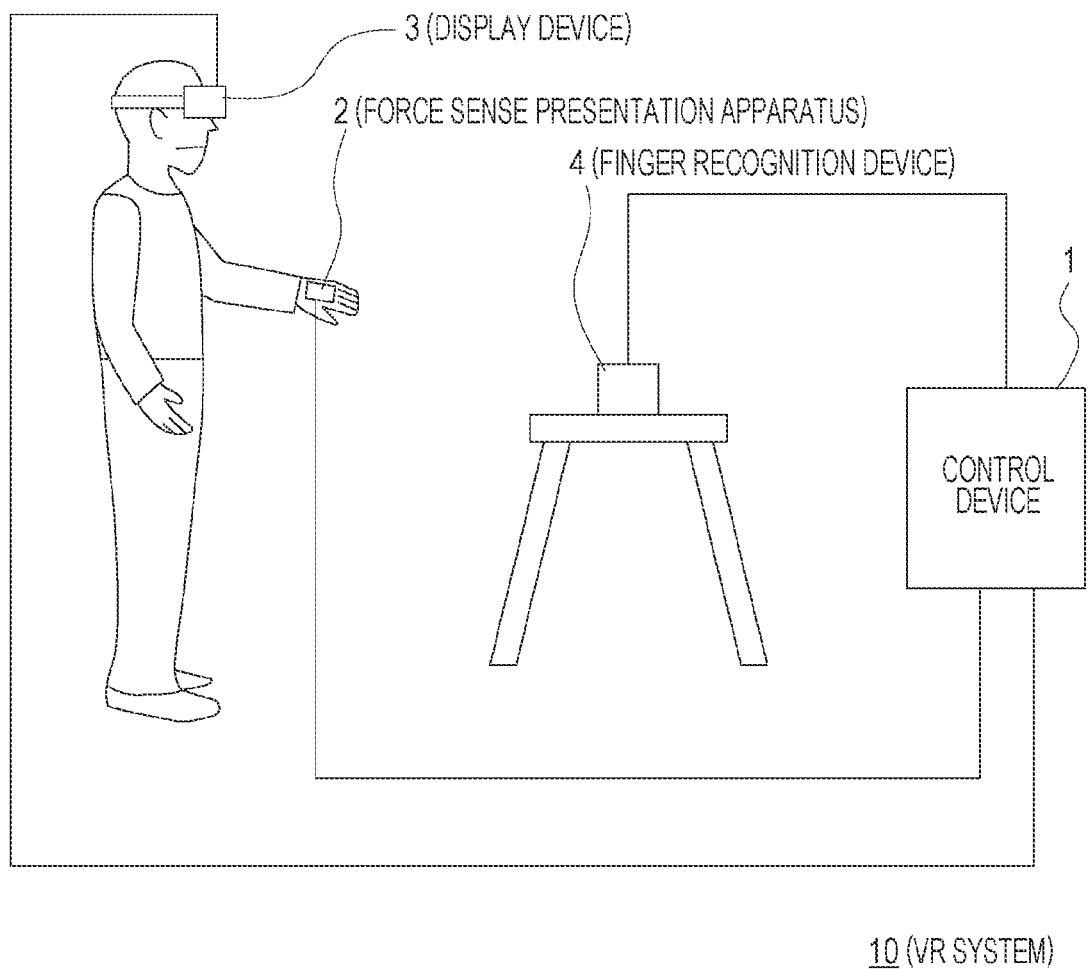
FIG. 1 is a diagram illustrating a configuration example of a virtual reality (VR) system including a control device and a force sense presentation apparatus according to an embodiment.

FIG. 1 illustrates a configuration example of a virtual reality (VR) system 10 including a control device 1 and a force sense presentation apparatus 2 according to the embodiment according to the present technology.

As illustrated, the VR system 10 includes a display device 3 and a finger recognition device 4 together with the control device 1 and the force sense presentation apparatus 2.

The force sense presentation apparatus 2 is worn on a target part of force sense presentation among the parts of a user to perform force sense presentation to the user. Specifically, the force sense presentation apparatus 2 of the present example is detachably worn on the hand of the user, and performs force sense presentation with a finger of the user as the target part.

The finger recognition device 4 recognizes the position and posture of the finger of the hand of the user wearing the force sense presentation apparatus 2. The finger recognition device 4 of the present example includes an imaging unit (camera unit) and an image recognition processing unit that performs an image recognition process on a captured image obtained by the imaging unit, and is configured as a device capable of performing motion capture without attaching a marker to the user. Examples of the finger recognition device 4 include Leap Motion (registered trademark) and the like.

The finger recognition device 4 in the present example recognizes each part of the hand of the user wearing the force sense presentation apparatus 2, specifically, each predetermined part of the hand of the user such as a joint part, a fingertip part, a palm (the flat of the hand) part, or a wrist part of each finger, and recognizes the position of each recognized part in a real space.

The finger recognition device 4 outputs, as finger recognition result information, information indicating the position of each part of the hand of the user recognized as above in the real space to the control device 1.

The control device 1 is configured as a computer device such as a personal computer, for example, and performs generation of a virtual space image which is an image representing a virtual space VS, control for displaying the generated virtual space image on the display device 3, and the like.

Figure 2:
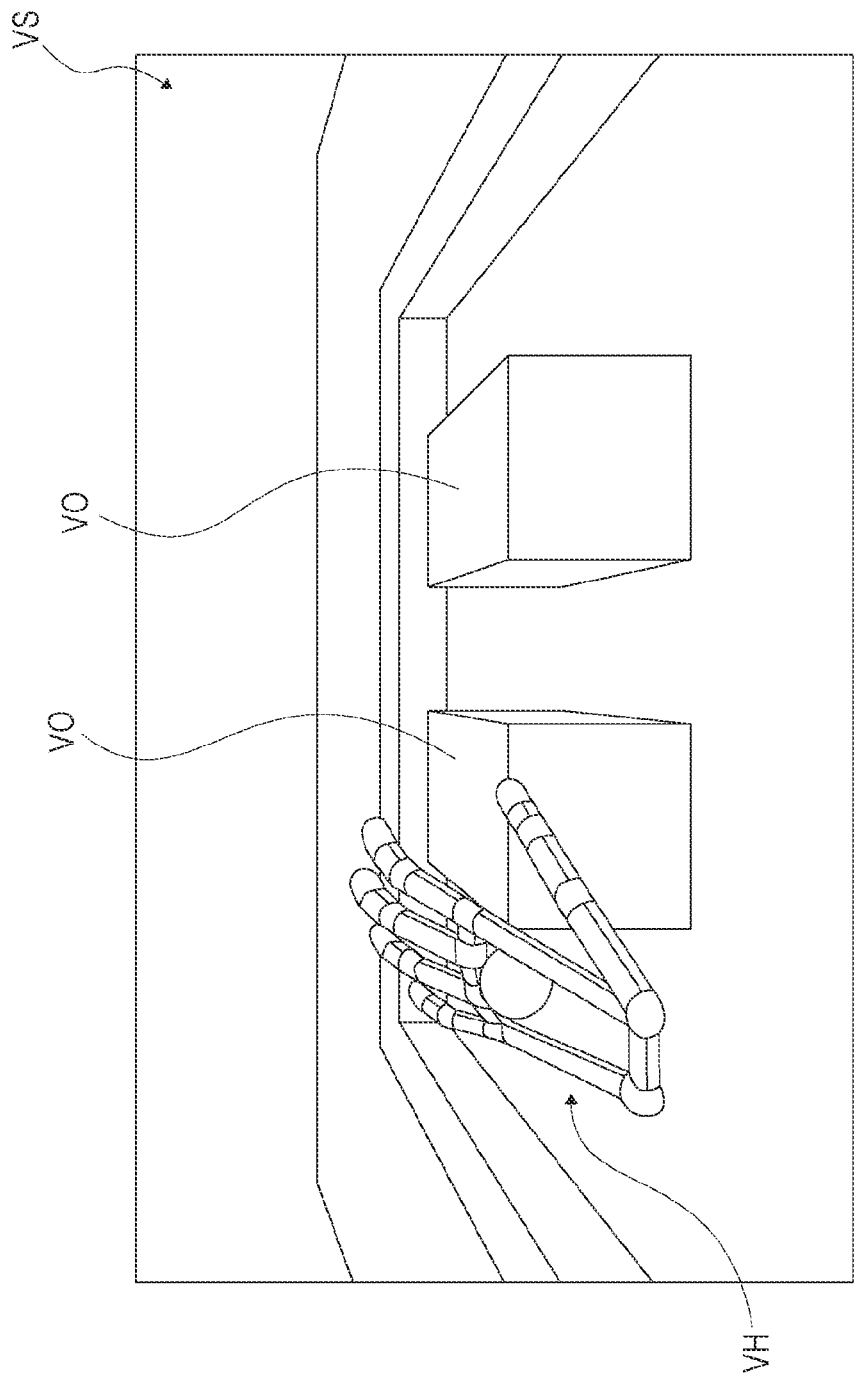
FIG. 2 is a diagram illustrating an example of a virtual space image.

FIG. 2 illustrates an example of the virtual space image.

In the virtual space image, a virtual hand VH representing the hand on which the force sense presentation apparatus 2 is worn as an image is displayed in the virtual space VS. The motion and displacement of the virtual hand VH in the virtual space VS reflect the actual motion and displacement of the hand recognized by the finger recognition device 4. Furthermore, the position of the virtual hand VH in the virtual space VS is obtained by mapping the position of the hand in the real space recognized by the finger recognition device 4 to the virtual space VS, and reflects the position in the real space.

In the virtual space VS represented by the virtual space image, a virtual object VO is arranged. In the example of FIG. 2, the virtual hand VH and two virtual objects VO are arranged.

On the basis of the finger recognition result information input from the finger recognition device 4, the control device 1 generates a virtual space image in which the virtual hand VH which moves reflecting the motion of the actual hand of the user is represented in the position reflecting the position in the real space as described above, and causes the virtual space image to be displayed on the display device 3.

Note that the control device 1 not only generates the virtual space image as described above but also controls the force sense presentation apparatus 2, which will be described later again.

The display device 3 displays the virtual space image to the user. That is, the user visually perceives the virtual space VS represented by the virtual space image.

The display device 3 of the present example is configured as a head mounted display (HMD) detachably worn on the head of the user.

Note that the form of the display device 3 is not limited to the form of the HMD, and other forms such as a form in which the virtual space image is displayed to the user in a state where the display device is not worn by the user can be adopted.

2. Configuration Example of Force Sense Presentation Apparatus

A configuration example of the force sense presentation apparatus 2 will be described with reference to FIGS. 3 to 8.

Note that, in the following, in order to avoid complication of the description, it is assumed that force sense presentation is performed for only one finger among a plurality of fingers of the user.

Figure 3:
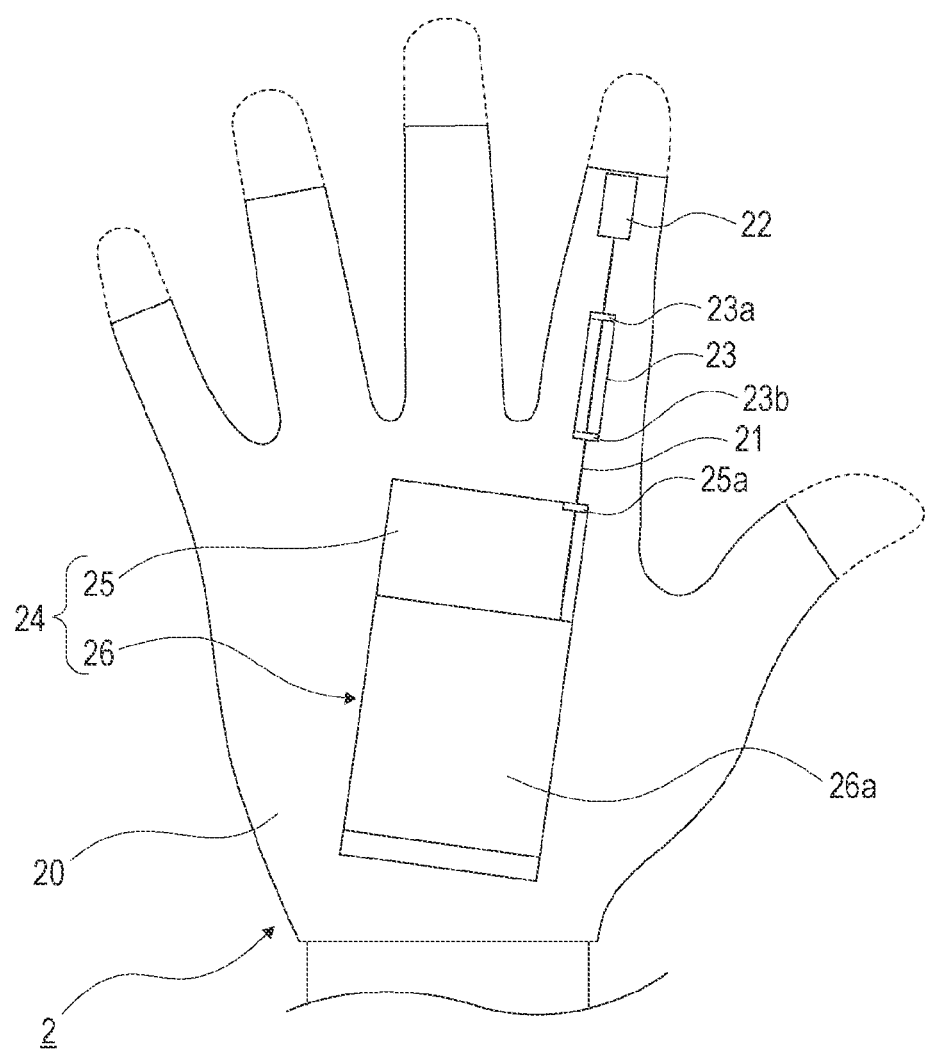
FIG. 3 is a top view of the force sense presentation apparatus according to the embodiment.
Figure 4:
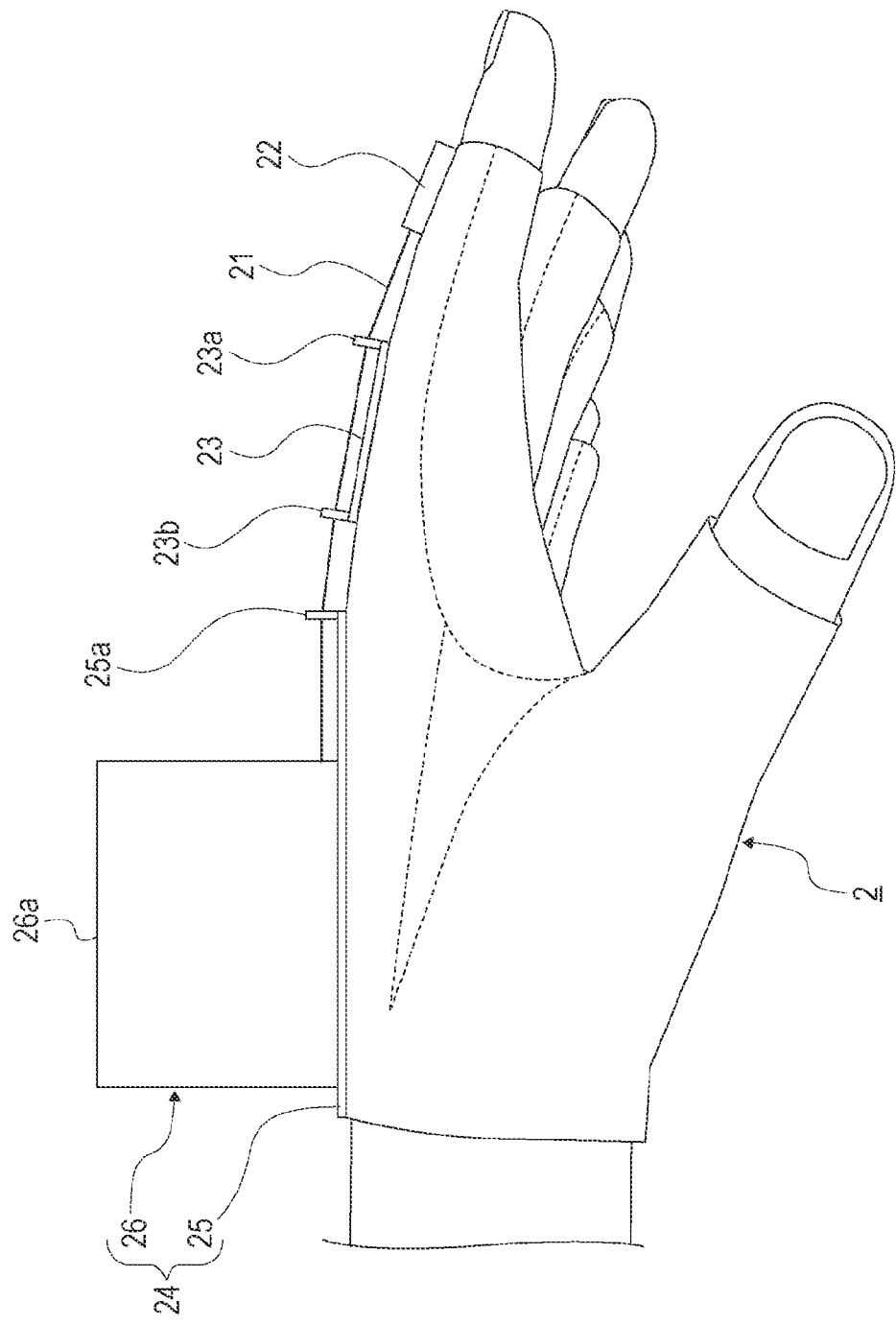
FIG. 4 is a right side view of the force sense presentation apparatus according to the embodiment.

FIGS. 3 and 4 are a top view and a right side view of the force sense presentation apparatus 2.

The force sense presentation apparatus 2 includes a globe unit 20 detachably worn on the hand of the user, a wire 21 which is a wire having a diameter of, for example, about several millimeters and including metal, resin, or the like, and a locking unit 22, a guide member 23, and a wire control unit 24 each of which is fixed to the globe unit 20.

In the force sense presentation apparatus 2 of the present example, the locking unit 22 and the guide member 23 are arranged on the back side of the finger as the target of force sense presentation. Here, the back side of the fingers means the back side of the hand among the back side and the palm (the flat of the hand) side of the hand which are in a front-back relationship in the hand.

The locking unit 22 is arranged at a position closer to the fingertip than the guide member 23 on the target finger, and locks one end of the wire 21.

The guide member 23 guides the wire 21 to creep along the back of the target finger. Specifically, in the guide member 23, guide holes 23a and 23b through which the wire 21 is inserted are formed at the end portion on the fingertip side and the end portion on the root side of the finger, respectively, and the wire 21 is inserted into the guide holes 23a and 23b to be guided to be arranged from the fingertip side toward the root direction of the finger.

The wire control unit 24 includes, for example, a plate-shaped pedestal portion 25 fixed to the globe unit 20, and a wire control part 26 formed on the pedestal portion 25, and performs control of unwinding the wire 21 in a fingertip direction and pulling the wire 21 to the side opposite to the fingertip side.

In the present example, the wire control unit 24 is arranged on the back side of the hand among the palm side and the back side of the hand side, similarly to the locking unit 22 and the guide unit 23 described above. Specifically, the wire control unit 24 of the present example is arranged at a position on the back of the hand, that is, at a position of the hand closer to the fingertip side than the wrist and closer to the wrist side than the finger.

In the wire control unit 24, a guide hole 25a is formed at the end portion on the fingertip side of the pedestal portion 25, and the wire 21 is inserted into the guide hole 25a.

The wire control part 26 has an internal structure 26b to be described below inside a case 26a illustrated in the drawings, thereby locking the other end of the wire 21 and performing control of unwinding or pulling the wire 21 described above.

Here, as can be seen with reference to FIGS. 3 and 4, in the present example, the locking unit 22 which locks the wire 21 on the fingertip side is positioned between a first joint (distal interphalangeal joint (DIP joint)) and a second joint (proximal interphalangeal joint (PIP joint)) of the target finger. Furthermore, the guide member 23 is arranged between the second joint and a third joint (metacarpal phalangeal joint (MP joint)) of the target finger.

When the locking unit 22 is positioned between the first joint and the second joint, it is not necessary to cover the fingertip portion ahead of the first joint with the globe unit 20. Therefore, it is possible to alleviate the sense of restraint of the hand when the force sense presentation apparatus 2 is worn, and it is possible to enhance the sense of immersion in the virtual space VS.

Furthermore, in the present example, the wire control unit 24 including the wire control part 26 is arranged at a position of the hand of the user closer to the fingertip side than the wrist and closer to the wrist side than the finger, but with this arrangement, the wire control unit 24 is arranged not to straddle the wrist of the user.

Therefore, it is possible to prevent hindrance to the motion of the hand of the user, and it is possible to enhance the user's sense of immersion in the virtual space. Note that in order to obtain a similar effect, the wire control unit 24 may be arranged closer to an arm side than the wrist.

Figure 5:
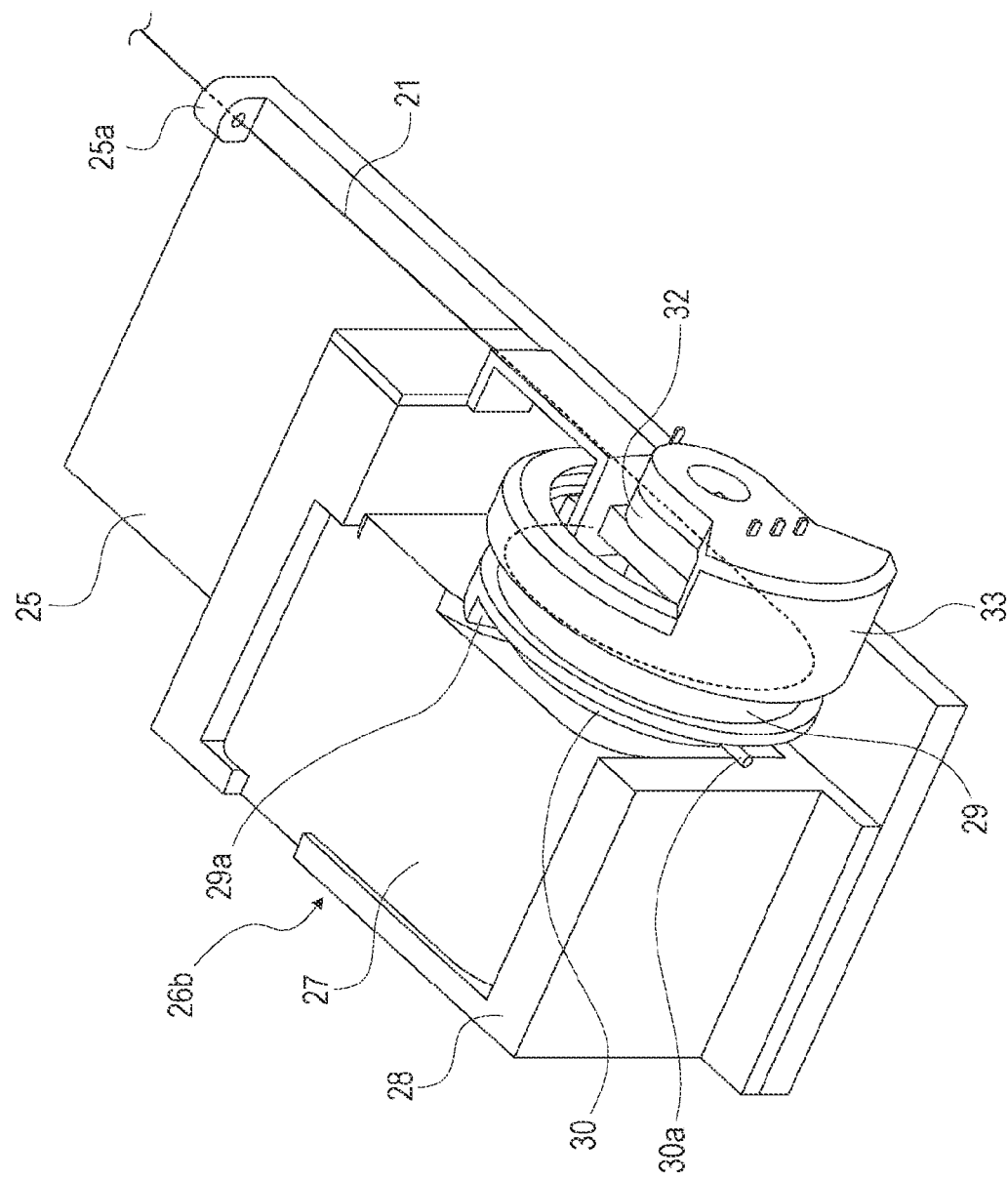
FIG. 5 is a perspective view of a wire control unit with a case removed according to the embodiment.
Figure 6:
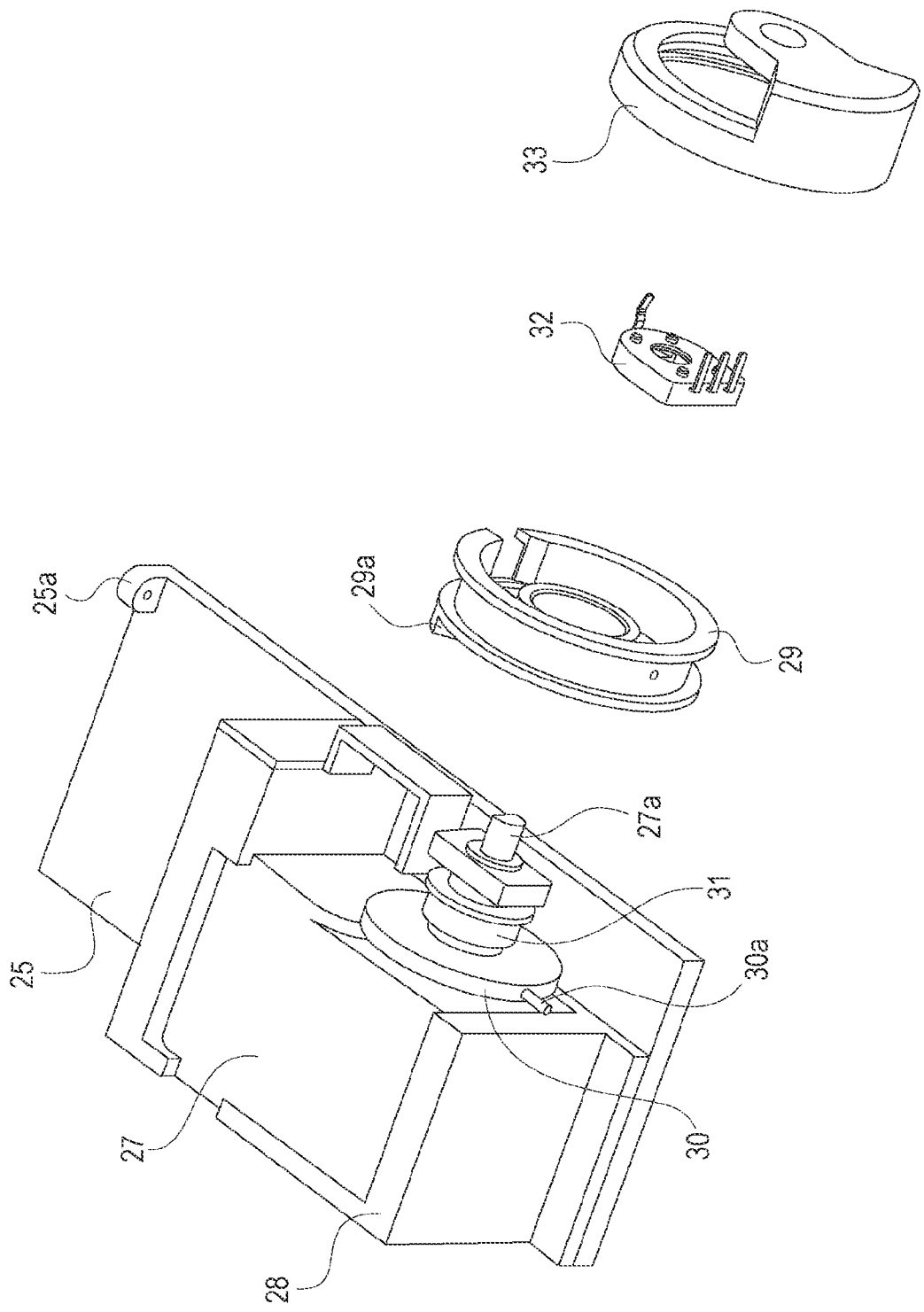
FIG. 6 is an exploded perspective view of main components of an internal structure of the wire control unit according to the embodiment.

FIGS. 5 and 6 are diagrams for explaining a configuration of an internal structure 26b of the wire control part 26, FIG. 5 is a perspective view of the wire control unit 24 in a state where the case 26a is removed, and FIG. 6 is an exploded perspective view of main components in the internal structure 26b of the wire control unit 24.

The internal structure 26b includes, for example, a motor 27 that is a servomotor, a holding unit 28 that is fixed to the pedestal portion 25 and holds the motor 27, a pulley 29 that locks another end of the wire 21 and is rotatable in a direction in which the wire 21 is wound and a direction opposite to the direction (a direction in which the wire 21 is unwound to the fingertip side), a rotation unit 30 that is rotated in conjunction with rotation of a rotation shaft 27a of the motor 27, an urging unit 31 (see FIG. 6) that is attached to the rotation shaft 27a, has an outer peripheral portion in which an inner peripheral portion of the pulley 29 is fixed, and applies an urging force to the wire 21, a position sensor 32 that detects a rotational position of a wire-side stopper 29a (described later) of the pulley 29, and a cover unit 33 that covers at least the position sensor 32 and a part of the pulley 29.

The urging unit 31 includes a spiral spring wound around the rotation shaft 27a of the motor 27 in an axial direction, and applies the urging force in the axial direction of the rotation shaft 27a to the pulley 29 fixed to the outer peripheral portion. This urging force is also applied to the wire 21 having the other end locked to the pulley 29.

FIG. 7 is an explanatory diagram of an urging direction by the urging unit 31.

The urging direction by the urging unit 31 is a direction indicated by an arrow Y in the drawing, that is, a direction in which the wire 21 is wound.

Here, the urging force by the urging unit 31 is set to a slight urging force to the extent of maintaining the tension of the wire 21 so as not to hinder the free motion of the hand on which the force sense presentation apparatus 2 is worn.

In FIGS. 5 and 6, the inner peripheral portion of the pulley 29 is fixed to the outer peripheral portion of the urging unit 31 as described above, so that the pulley is rotatable coaxially with the rotation shaft 27a of the motor 27.

In the pulley 29, a protrusion protruding in a direction orthogonal to a rotation surface is formed, and the protrusion forms the wire-side stopper 29a.

The rotation unit 30 is configured as, for example, a substantially disk-shaped member, has an inner peripheral portion fixed to the rotation shaft 27a of the motor 27, and rotates coaxially with the rotation shaft 27a in conjunction with the rotation of the rotation shaft 27a.

The rotation unit 30 is formed with a drive part-side stopper 30a capable of abutting on the wire-side stopper 29a of the pulley 29 to restrict the rotation of the pulley 29, that is, to restrict the movement of the wire 21. In the present example, the drive part-side stopper 30a is formed as a portion in which a part of the outer periphery of the disk-shaped main body of the rotation unit 30 protrudes in an outer peripheral direction.

Here, in the rotation direction of the pulley 29, when the rotation direction when the wire 21 is unwound to the fingertip side is referred to as an "unwinding direction" and the rotation direction when the wire 21 is wound is referred to as a "winding direction", the drive part-side stopper 30a is positioned on the unwinding direction side with respect to the wire-side stopper 29a on the track of the wire-side stopper 29a accompanying the rotation of the pulley 29. Then, when the rotation unit 30 is rotated by the motor 27, the drive part-side stopper 30a is displaceable in a direction of being brought into contact with or separated from the wire-side stopper 29a, that is, in a direction of approaching the wire-side stopper 29a and a direction of being separated from the wire-side stopper.

The position sensor 32 is, for example, a potential meter, and detects a rotation angle of the pulley 29. This information of the rotation angle can be rephrased as information indicating the position of the wire-side stopper 29a in the rotation direction of the pulley 29.

FIG. 8 is an operation explanatory diagram of the force sense presentation apparatus 2.

In the force sense presentation apparatus 2 having the structure described above, the position (position in the rotation direction) of the drive part-side stopper 30a changes with the rotation of the rotation unit 30. On the other hand, the position of the wire-side stopper 29a changes in accordance with the rotation of the pulley 29 according to the motion (bending or stretching of the finger) of the finger as the target of the force sense presentation.

As illustrated in FIG. 8A, in a case where an interval between the wire-side stopper 29a and the drive part-side stopper 30a is sufficiently wide, the wire-side stopper 29a does not abut on the drive part-side stopper 30a even when the user bends the finger so that the pulley 29 is rotated in the direction in which the wire 21 is unwound. As a result, even when user freely moves the finger, the motion is not hindered.

At this time, even when the user bends and then stretches the finger, the tension of the wire 21 is maintained by the urging force of the urging unit 31.

On the other hand, as illustrated in FIG. 8B, in a state where the drive part-side stopper 30a is in contact with the wire-side stopper 29a, the pulley 29 is restricted from rotating in the unwinding direction, and therefore, the wire 21 is restricted from being unwound to the fingertip side. Then, in a state where the drive part-side stopper 30a is in contact with the wire-side stopper 29a as described above, when a torque in the winding direction (the direction of the arrow in FIG. 8B) is applied to the rotation unit 30 by the motor 27, the torque is transmitted from the drive part-side stopper 30a to the pulley 29 via the wire-side stopper 29a, and the wire 21 can be forcibly wound. That is, the finger on which the force sense presentation apparatus 2 is worn can be applied with a force in a direction of stretching the finger.

Figure 9:
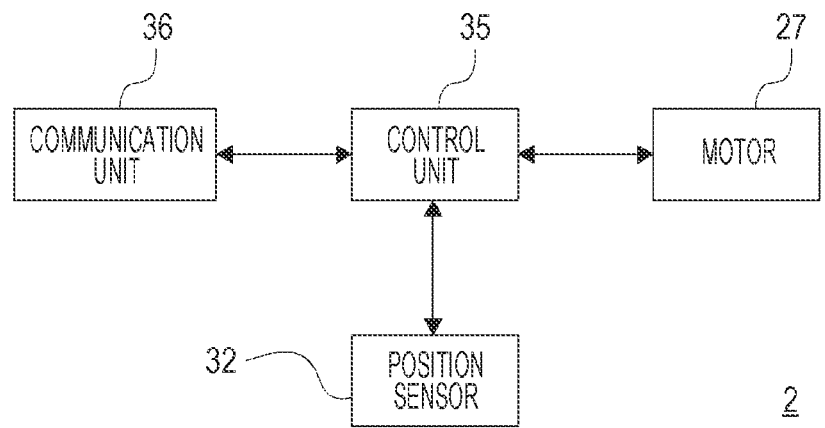
FIG. 9 is a block diagram illustrating an electrical configuration example of the force sense presentation apparatus according to the embodiment.

FIG. 9 is a block diagram illustrating an electrical configuration example of the force sense presentation apparatus 2.

As illustrated, the force sense presentation apparatus 2 includes, as the electrical configuration, the motor 27 and the position sensor 32 described above, and also includes a control unit 35 and a communication unit 36.

The control unit 35 includes, for example, a microcomputer including a central processing unit (CPU), a read only memory (ROM), a random access memory (RAM), or the like, or a signal processing device such as an integrated circuit (IC), and performs overall control of the force sense presentation apparatus 2.

The control unit 35 is connected to the communication unit 36 that performs data communication with an external device, and can exchange various types of data with the control device 1 illustrated in FIG. 1 via the communication unit 36.

Furthermore, the control unit 35 performs drive control of the motor 27 on the basis of an instruction from the control device 1 or detection information by the position sensor 32. Note that specific processing executed by the control unit 35 regarding such drive control of the motor 27 will be described later again.

3. Configuration Example of Control Device

Figure 10:
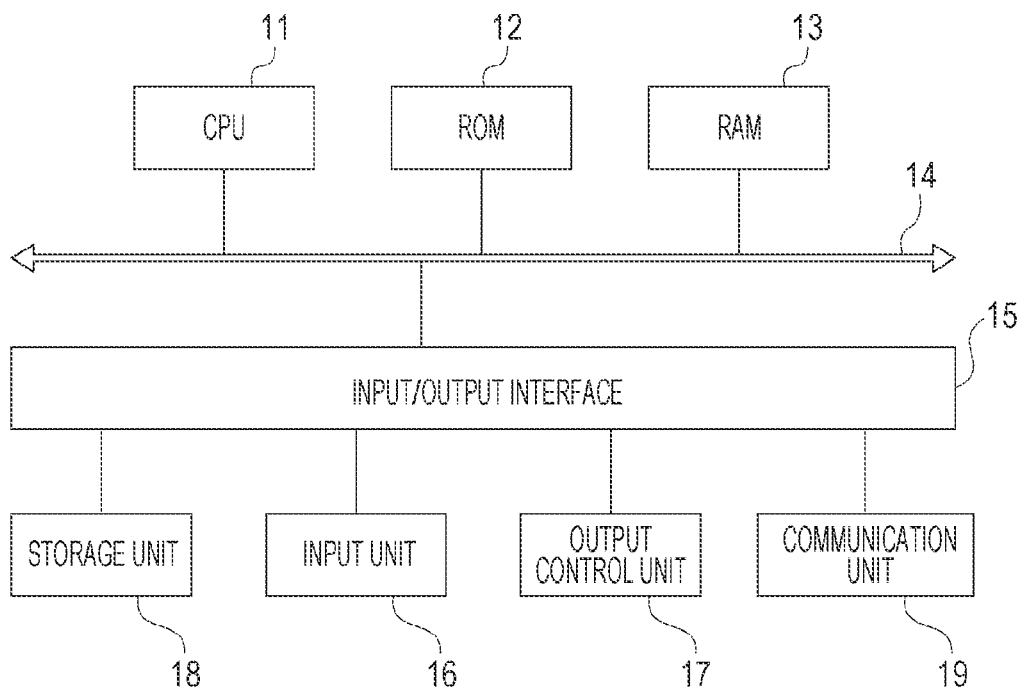
FIG. 10 is a block diagram illustrating an internal configuration example of a control device according to the embodiment.

FIG. 10 is a block diagram illustrating an internal configuration example of the control device 1.

As illustrated in the drawing, the control device 1 includes a CPU 11, a ROM 12, a RAM 13, a bus 14, an input/output interface 15, an input unit 16, an output control unit 17, a storage unit 18, and a communication unit 19.

The CPU 11 executes various processes according to a program stored in the ROM 12 or a program loaded from the storage unit 18 into the RAM 13. The RAM 13 also appropriately stores data or the like necessary for the CPU 11 to execute various processes.

The CPU 11, the ROM 12, and the RAM 13 are connected to one another via the bus 14. The input/output interface 15 is also connected to the bus 14.

The input unit 16, the output control unit 17, the storage unit 18, and the communication unit 19 are connected to the input/output interface 15.

The input unit 16 comprehensively indicates an input device for the user to input various types of information to the control device 1, and specifically, includes a keyboard, a mouse, a touch panel, and the like.

The output control unit 17 controls an output device such as a display or a speaker connected to the control device 1. The display control for causing the virtual space image to be displayed on the display device 3 illustrated in FIG. 1 is performed via the output control unit 17.

The storage unit 18 includes a flash memory device, a hard disk drive (HDD), or the like.

The communication unit 19 performs a communication process and inter-device communication via a network. The CPU 11 can perform data communication with the control unit 35 of the force sense presentation apparatus 2 via the communication unit 19. Furthermore, the CPU 11 can input the finger recognition result information from the finger recognition device 4 via the communication unit 19.

In such a control device 1, data and programs can be uploaded and downloaded by communication by the communication unit 19.

The CPU 11 generates a virtual space image and controls the force sense presentation apparatus 2 described above on the basis of a predetermined program (application program).

4. Control Method as Embodiment

A method of controlling the force sense presentation apparatus 2 according to an embodiment will be described with reference to FIGS. 11 to 13.

Figure 11:
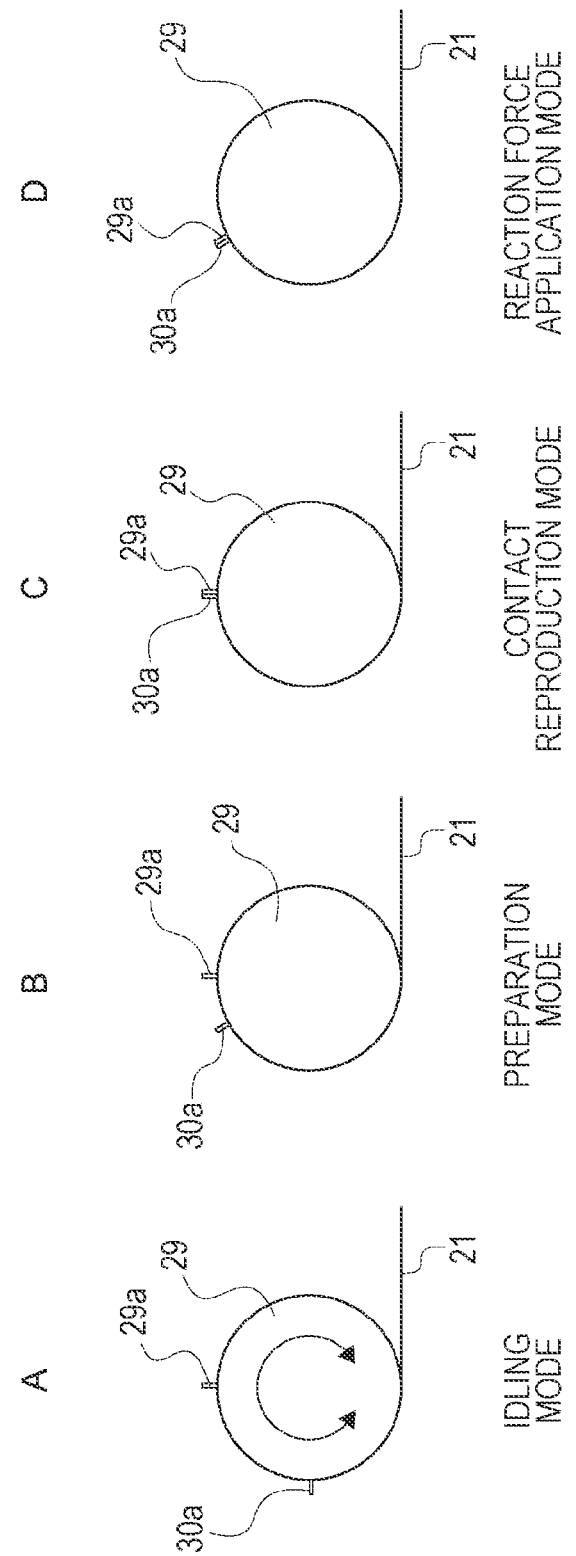
FIG. 11 is an explanatory diagram of control modes of the force sense presentation apparatus defined in the embodiment.

FIG. 11 is an explanatory diagram of control modes of the force sense presentation apparatus 2 defined in the embodiment.

An idling mode illustrated in FIG. 11A is a mode in which the drive part-side stopper 30a is positioned at a predetermined retraction position, and the wire-side stopper 29a which is displaced when the target finger is bent is prevented from coming into contact with the drive part-side stopper 30a, thereby preventing the hindrance to the free motion of the finger.

Here, the retraction position described above is determined as a position where the drive part-side stopper 30a does not come into contact with the wire-side stopper 29a even in a state where the target finger is bent maximally.

A preparation mode illustrated in FIG. 11B is a mode in which the drive part-side stopper 30a (rotation unit 30) is driven such that the drive part-side stopper 30a follows the wire-side stopper 29a with a constant interval.

In this preparation mode, even when the wire-side stopper 29a is displaced in conjunction with the motion of the finger, the interval between the wire-side stopper 29a and the drive part-side stopper 30a is maintained at a constant interval by the drive part-side stopper 30a being displaced following the movement of the wire-side stopper 29a.

As will be understood from the following description, the preparation mode is a mode intended to bring the drive part-side stopper 30a into contact with the wire-side stopper 29a quickly. Therefore, in the preparation mode, the position of the drive part-side stopper 30a is maintained at a position relatively close to the wire-side stopper 29a.

A contact reproduction mode illustrated in FIG. 11C is a mode in which the drive part-side stopper 30a is brought into contact with the wire-side stopper 29a to restrict the displacement of the wire-side stopper 29a in the unwinding direction, that is, to restrict the motion of the target finger in the bending direction, thereby allowing the user to perceive a sensation of touching the object.

In the contact reproduction mode of the present example, the drive part-side stopper 30a is pushed in the unwinding direction when the user applies a force to bend the finger against the drag of the drive part-side stopper 30a which restricts the displacement of the wire-side stopper 29a. That is, even after a shift to the state in which the displacement of the wire-side stopper 29a is restricted by the contact of the drive part-side stopper 30a, the user can bend the finger by applying a certain amount or more of force.

Specifically, in the contact reproduction mode of the present example, control is performed with the drive target position of the drive part-side stopper 30a set to a position at which the drive part-side stopper 30a comes into contact with the wire-side stopper 29a (that is, a position at which the clearance from the wire-side stopper 29a becomes zero), and the drive part-side stopper 30a is not driven in a direction in which the wire-side stopper 29a is pushed in the winding direction. Therefore, the user can bend the finger by applying a force exceeding the drag of the drive part-side stopper 30a in contact with the wire-side stopper 29a.

A reaction force application mode illustrated in FIG. 11D is a mode in which the drive part-side stopper 30a is driven so that a reaction force is applied to the wire-side stopper 29a in a state where the drive part-side stopper 30a is in contact with the wire-side stopper 29a. Specifically, in the mode, in a state where the drive part-side stopper 30a is in contact with the wire-side stopper 29a, the motor 27 applies a torque in the winding direction to the drive part-side stopper 30a.

With such a reaction force application mode, it is possible to express the reaction force from the object when the touched object is further pushed in.

Figure 12:
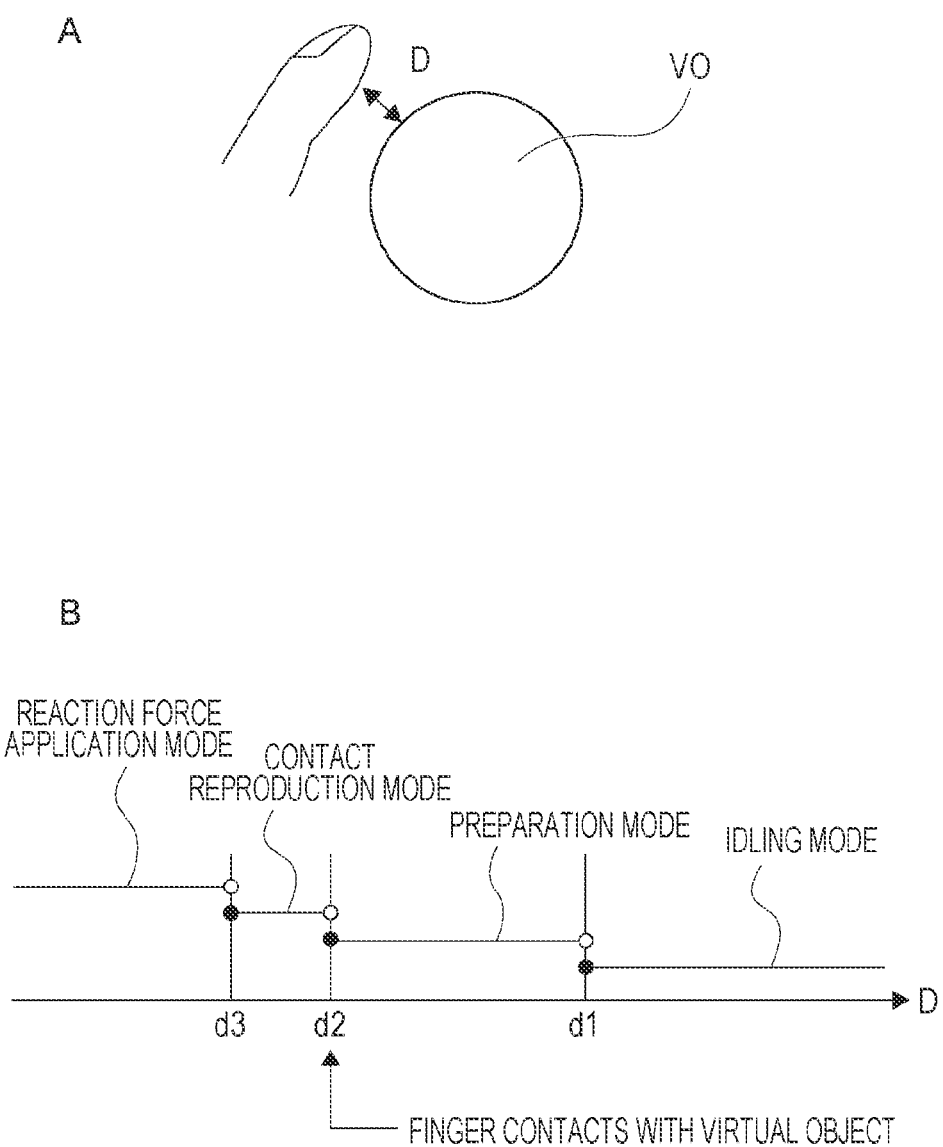
FIG. 12 is an explanatory diagram of an example of switching of the control mode according to the embodiment.

FIG. 12 is an explanatory diagram of an example of switching of the control mode according to the embodiment.

In the present embodiment, by changing the driving state of the drive part-side stopper 30a according to a positional relationship between the virtual object VO and the target finger in the virtual space VS, switching of the control mode according to the positional relationship is realized.

Specifically, in the present example, the control mode is switched according to a separation distance D between the target finger and the virtual object VO as illustrated in FIG. 12A. In the present example, the separation distance D is a distance from the fingertip part of the target finger to the surface of the virtual object VO.

In the present embodiment, each threshold d for the separation distance D as illustrated in FIG. 12B is set in order to switch the control mode according to the separation distance D.

Among these thresholds d, a threshold d1 is the threshold d referred to for switching between the idling mode and the preparation mode, and a threshold d2 is the threshold d referred to for switching between the preparation mode and the contact reproduction mode. A threshold d3 is the threshold d referred to for switching between the contact reproduction mode and the reaction force application mode. A magnitude relationship among these thresholds d1, d2, and d3 is "d3<d2<d1".

In the present example, the idling mode is selected in a case where the separation distance D is larger than the threshold d1, and the preparation mode is selected in a case where the separation distance D is equal to or less than the threshold d1 and larger than the threshold d2. Moreover, the contact reproduction mode is selected in a case where the separation distance D is equal to or less than the threshold d2 and larger than the threshold d3, and the reaction force application mode is selected in a case where the separation distance D is equal to or less than the threshold d3.

Since the threshold d2 is the threshold d for switching to the contact reproduction mode, the threshold d2 is set to zero in the present example. Accordingly, the threshold d3 is set to a negative value.

As described above, by selecting the idling mode in a case where the separation distance D is larger than the threshold d1, that is, by positioning the drive part-side stopper 30a at the retraction position, it is possible to prevent that the motion of the finger is erroneously restricted even when the target finger is separated from the virtual object VO in the virtual space VS.

Furthermore, by selecting the preparation mode in a case where the separation distance D is equal to or less than the threshold d1 and larger than the threshold d2, in a case where the target finger approaches the virtual object VO in the virtual space VS and the contact with the virtual object VO is predicted, the position of the drive part-side stopper 30a can be kept close to the wire-side stopper 29a. Therefore, in a case where it is estimated that the contact (virtual contact) with the virtual object VO has been made, the drive part-side stopper 30a can be quickly brought into contact with the wire-side stopper 29a, and the responsiveness of force sense presentation at the time of virtual contact can be enhanced.

Moreover, by selecting the contact reproduction mode in a case where the separation distance D is equal to or less than the threshold d2, it is possible to apply a drag expressing the contact with the object to the finger in response to the estimation that the target finger comes into contact with the virtual object VO in the virtual space VS. That is, according to the contact (virtual contact) with the virtual object, it is possible to allow the user to perceive the sensation of touching the object.

Furthermore, by selecting the reaction force application mode in a case where the separation distance D becomes equal to or less than the threshold d3, it is possible to express the reaction force from the object when the touched object is further pushed in. That is, it is possible to allow the user to perceive not only the sensation of touching the object but also the reaction force when the object is pushed in.

Here, the threshold d2 referred to at the time of switching to the contact reproduction mode is not necessarily limited to "zero". For example, in a case where the virtual object VO having a soft tactile sensation such as a marshmallow is assumed, the drag from the object in a case where the user touches the surface is substantially equal to zero, and it is assumed that the user feels the drag from the object in a case where the user pushes the finger in to some extent from the surface. In such a case, when the threshold d2 is set to zero, there is a possibility that a deviation from the sense to be actually obtained occurs. Therefore, it is conceivable to set the threshold d2 to a value smaller than zero.

Alternatively, it is also conceivable to set the threshold d2 to a value smaller than zero in consideration of various processing delays and the like that may occur from generation to display of the virtual space image.

The switching from the preparation mode to the contact reproduction mode is only required to be performed on the basis of the result of estimating the presence or absence of contact with the virtual object VO on the basis of the separation distance D, and the threshold d2 is only required to be appropriately set to an optimum value as a value near zero.

Furthermore, regarding the switching of the control mode described above, how much the virtual object VO is pushed in to apply the reaction force can be determined depending on the magnitude of the threshold d3. That is, by adjusting the threshold d3, it is possible to adjust an initial response characteristic regarding the stiffness of the object when the touched object is pushed in, in other words, an expression mode regarding the stiffness of the object surface.

Figure 13:
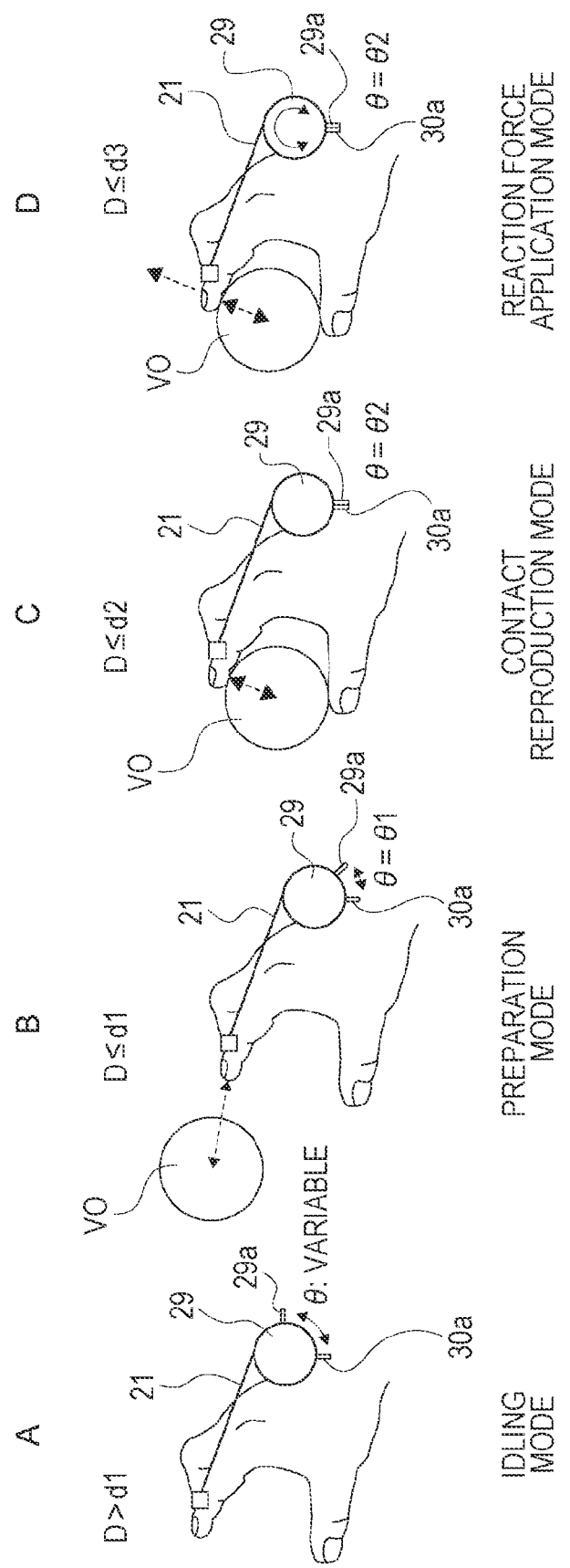
FIG. 13 is an explanatory diagram of an inter-stopper distance used in the control mode switching of the embodiment.

FIG. 13 is an explanatory diagram of an inter-stopper distance θ used in the control mode switching of the embodiment.

The inter-stopper distance θ means a separation distance (clearance) between the wire-side stopper 29a and the drive part-side stopper 30a in the rotation direction (that is, the same as the rotation direction of the rotation unit 30) of the pulley 29.

In the idling mode illustrated in FIG. 13A, the inter-stopper distance θ is variable according to the motion of the target finger. As described above, the retraction position of the drive part-side stopper 30a in the idling mode in the present example is determined as a position where the drive part-side stopper 30a does not come into contact with the wire-side stopper 29a even in a state where the target finger is bent maximally, and thus, the inter-stopper distance θ is not zero (θ>0) in the idling mode.

In the preparation mode illustrated in FIG. 13B, the inter-stopper distance θ is maintained at a constant value as θ1. In the preparation mode, since the target finger is not in contact with the virtual object VO, it is necessary to prevent that the drive part-side stopper 30a comes into contact with the wire-side stopper 29a to erroneously restrict the motion of the finger. Furthermore, at the same time, in the preparation mode, it is required to quickly bring the drive part-side stopper 30a into contact with the wire-side stopper 29a in response to the estimation of the contact of the target finger with the virtual object VO. In consideration of these points, θ1 which is the inter-stopper distance θ in the preparation mode is set to a value larger than zero and as small as possible.

In the contact reproduction mode illustrated in FIG. 13C and in the reaction force application mode illustrated in FIG. 13D, the inter-stopper distance θ is θ2 smaller than θ1 described above. Specifically, in the contact reproduction mode and the reaction force application mode, the drive part-side stopper 30a is brought into contact with the wire-side stopper 29a, and thus, θ2 is zero.

5. Processing Procedure

Next, a procedure example of specific processing to be executed to realize the control method according to the embodiment described above will be described with reference to flowcharts of FIGS. 14 and 15.

Figure 14:
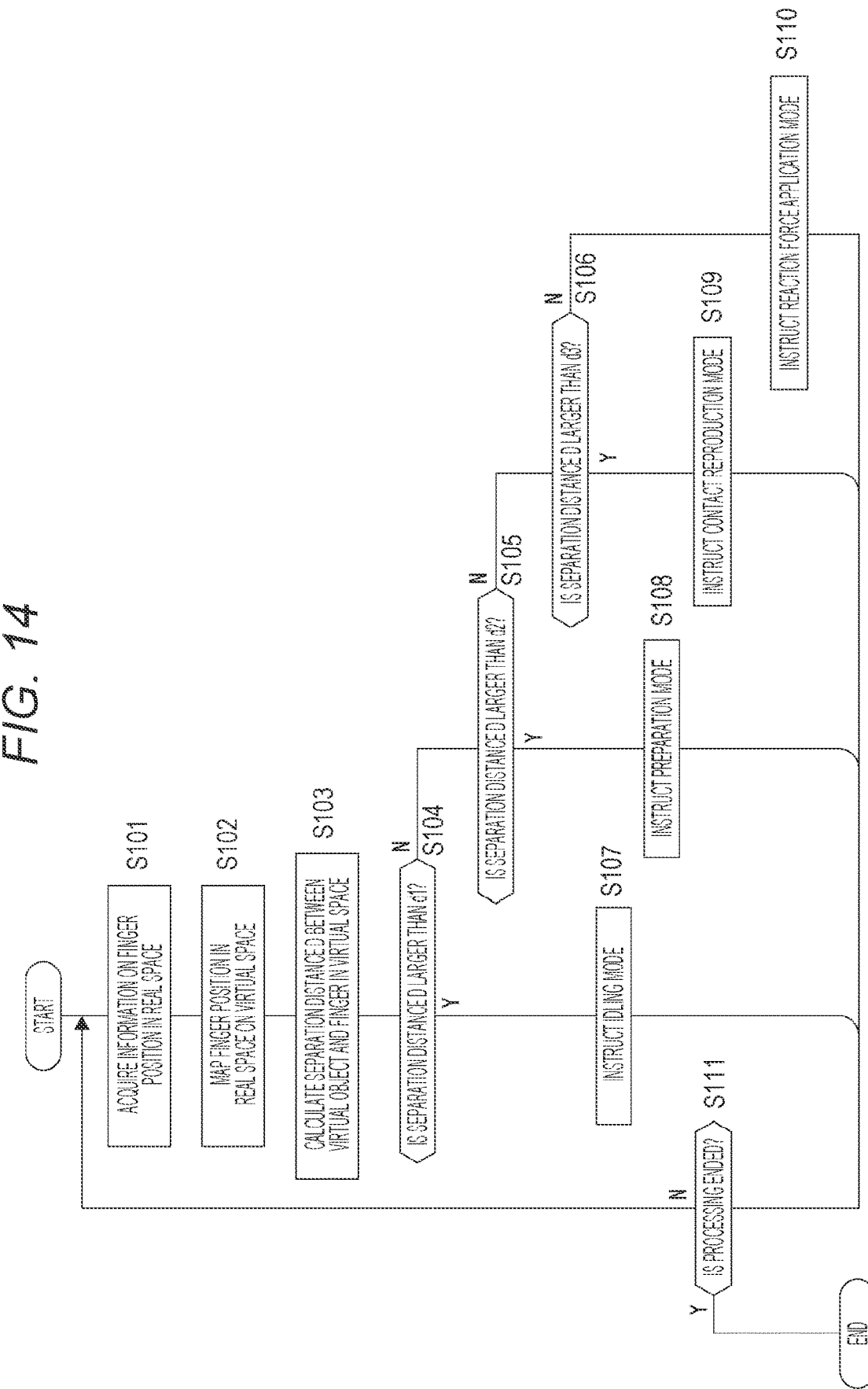
FIG. 14 is a flowchart illustrating a procedure example of specific processing to be executed by the control device in order to realize a control method according to the embodiment.

FIG. 14 illustrates a procedure example of specific processing to be executed by the CPU 11 of the control device 1 in order to realize the control method according to the embodiment.

First, in step S101, the CPU 11 acquires information of the finger position in the real space. That is, the above-described finger recognition result information is acquired from the finger recognition device 4.

In step S102 subsequent to step S101, the CPU 11 maps the finger position in the real space in the virtual space VS, and in step S103 subsequent thereto, calculates the separation distance D between the virtual object VO and the finger in the virtual space VS. As described above, in the present example, the distance between the surface and the fingertip part of the target finger in the virtual object VO is calculated as the separation distance D.

In step S104 subsequent to step S103, the CPU 11 determines whether or not the separation distance D is larger than the threshold d1. When the separation distance D is larger than the threshold d1, the CPU 11 proceeds to step S107 and executes a process of instructing the idling mode. That is, a process of instructing the control unit 35 of the force sense presentation apparatus 2 to perform the idling mode is performed.

On the other hand, in a case where it is determined in step S104 that the separation distance D is not larger than the threshold d1, the CPU 11 proceeds to step S105 and determines whether or not the separation distance D is larger than the threshold d2. In a case where it is determined that the separation distance D is larger than the threshold d2 (that is, the case of threshold d2<separation distance D≤threshold d1), the CPU 11 proceeds to step S108 and performs a process of instructing the preparation mode.

Furthermore, in a case where it is determined in step S105 that the separation distance D is not larger than the threshold d2 (that is, the case of separation distance D ≤ threshold d2), the CPU 11 proceeds to step S106 and determines whether or not the separation distance D is larger than the threshold d3. In a case where it is determined that the separation distance D is larger than the threshold d3 (that is, the case of threshold d3<separation distance D≤threshold d2), the CPU 11 proceeds to step S109 and performs a process of instructing the contact reproduction mode.

On the other hand, in a case where it is determined in step S106 that the separation distance D is not larger than the threshold d3 (that is, the case of separation distance D≤threshold d3), the CPU 11 proceeds to step S110 and performs a process of instructing the reaction force application mode.

In response to the execution of any of the processes in steps S107 to S110 described above, the CPU 11 proceeds to step S111 and determines whether or not the processing is ended. That is, it is determined whether or not a predetermined condition defined in advance as an end condition of the process illustrated in FIG. 14 is satisfied, for example, an end instruction operation of an application for displaying the virtual space image on the display device 3 installed in the control device 1 is performed.

In a case where it is determined in step S111 that the processing is not ended, the CPU 11 returns to step S101. Therefore, until it is determined that the processing is ended, the calculation of the separation distance D based on the finger recognition result information from the finger recognition device 4 and the instruction of the control mode according to the separation distance D are repeatedly executed.

Here, in the present example, the output cycle of the finger recognition result information by the finger recognition device 4 is, for example, the same cycle as the frame cycle of the virtual space image displayed on the display device 3, and thus, the calculation of the separation distance D and the instruction of the control mode according to the separation distance D described above are repeatedly executed at the same cycle as the frame cycle.

Furthermore, in a case where it is determined in step S111 that the processing is ended, the CPU 11 ends the series of processes illustrated in FIG. 14.

Figure 15:
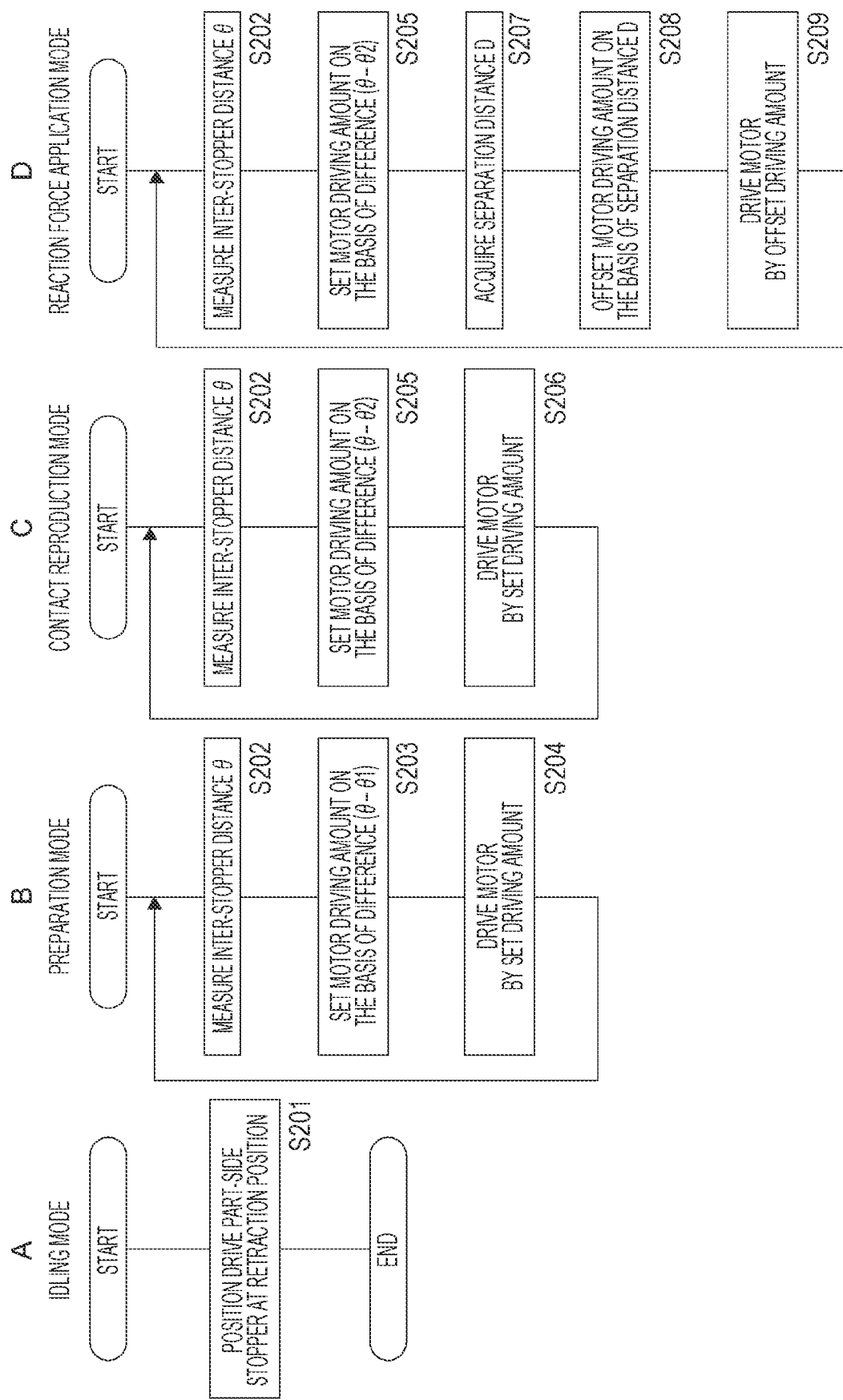
FIG. 15 is a flowchart illustrating a procedure example of specific processing to be executed by the force sense presentation apparatus in order to realize the control method according to the embodiment.

FIG. 15 illustrates a procedure example of specific processing to be executed by the control unit 35 of the force sense presentation apparatus 2 in order to realize the control method according to the embodiment.

The control unit 35 executes the process of the corresponding control mode among the processes illustrated in FIGS. 15A to 15D according to the idling mode, the preparation mode, the contact reproduction mode, and the reaction force application mode instructed from the control device 1 side.

Specifically, in a case where the idling mode is instructed, the control unit 35 executes a process of positioning the drive part-side stopper 30a at the retraction position as the process of step S201 illustrated in FIG. 15A. Here, the control unit 35 can specify the position of the drive part-side stopper 30a on the basis of information of the rotation angle of the motor 27. The process of step S201 is performed as a process of driving the motor 27 with the rotation angle of the motor 27 corresponding to the above-described retraction position as a target angle.

Furthermore, in a case where the preparation mode is instructed, the control unit 35 executes the process illustrated in FIG. 15B.

Specifically, the control unit 35 in this case first measures the inter-stopper distance θ in step S202. In the present example, the inter-stopper distance θ is measured on the basis of the information of the rotation angle of the motor 27 and the information of the rotation angle of the pulley 29 detected by the position sensor 32.

In step S203 subsequent to step S202, the control unit 35 performs a process of setting a motor driving amount on the basis of the difference (θ−θ1). That is, the process of setting the driving amount of the motor 27 is performed such that the difference between the inter-stopper distance θ measured in step S202 and θ1 (see FIG. 13B) becomes zero, in other words, the inter-stopper distance θ matches θ1.

In step S204 subsequent to step S203, the control unit 35 executes a process of driving the motor 27 by the set driving amount, and returns to step S202.

With such a process of FIG. 15B, the inter-stopper distance θ is maintained at θ1 in the preparation mode.

In a case where the contact reproduction mode is instructed, the control unit 35 executes the process illustrated in FIG. 15C.

In FIG. 15C, the control unit 35 measures the inter-stopper distance θ in step S202, and performs a process of setting the motor driving amount on the basis of a difference (θ−θ2) in subsequent step S205, that is, a process of setting the driving amount of the motor 27 such that the inter-stopper distance θ matches θ2 (=0). Then, in subsequent step S206, the control unit 35 executes a process of driving the motor 27 by the set driving amount, and returns to step S202.

According to the process illustrated in FIG. 15C, in the contact reproduction mode, the process of driving the motor 27 with the drive target position of the drive part-side stopper 30a set to the position in contact with the wire-side stopper 29a is repeatedly performed.

Therefore, it is possible to allow the user to perceive the sensation of touching the object.

In a case where the reaction force application mode is instructed, the control unit 35 executes the process illustrated in FIG. 15D.

In FIG. 15C, the control unit 35 measures the inter-stopper distance θ in step S202, and performs the process of setting the motor driving amount on the basis of the difference (θ−θ2) in subsequent step S205, that is, the process of setting the driving amount of the motor 27 such that the inter-stopper distance θ becomes zero.

Then, in step S207 subsequent to step S205, the control unit 35 performs a process of acquiring the separation distance D from the control device 1, and further in step S208 subsequent thereto, performs a process of offsetting the motor driving amount on the basis of the separation distance D. Here, the offset value of the motor driving amount in step S208 is set to a larger value as the absolute value of the target distance D (the target distance D in the reaction force application mode is a negative value) is larger.

In step S209 subsequent to step S208, the control unit 35 executes a process of driving the motor 27 by the offset driving amount, and returns to step S202.

By the process illustrated in FIG. 15D, in response to the target finger being further pushed in from the state of being in contact with the virtual object VO, a reaction force from the virtual object VO side can be applied to the finger.

At this time, since the offset value in step S208 is set to a larger value as the absolute value of the target distance D is larger as described above, the reaction force from the object can be appropriately expressed.

6. Modification

Here, the reaction force from the object when the touched object is pushed in may vary depending on the type of the object. In order to improve the accuracy of force sense presentation, it is desirable to be able to express such a difference in reaction force characteristic according to the type of object.

Figure 16:
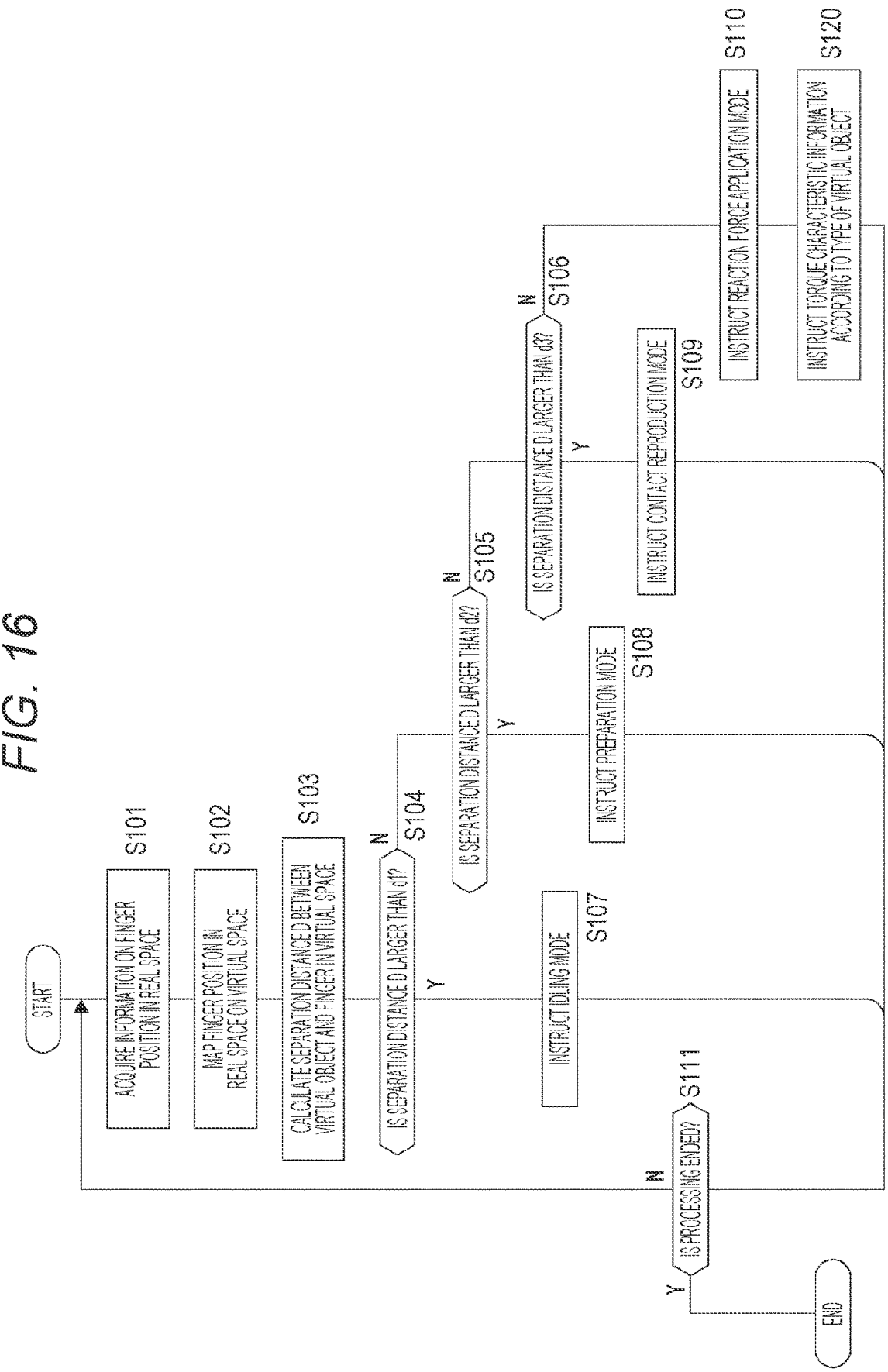
FIG. 16 is a flowchart illustrating a procedure example of specific processing to be executed by the control device in order to realize a control method as a modification.
Figure 17:
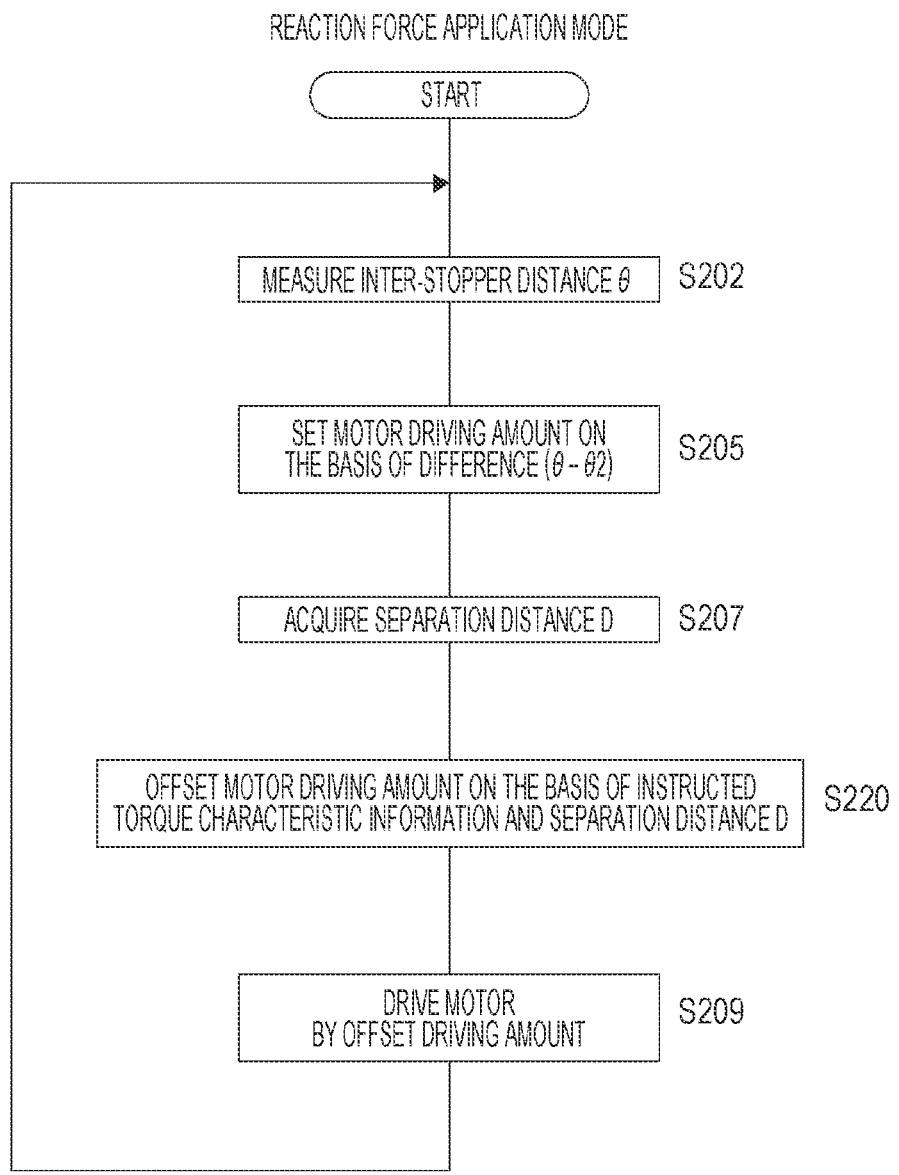
FIG. 17 is a flowchart illustrating a procedure example of specific processing to be executed by the force sense presentation apparatus in order to realize the control method as a modification.

The flowcharts in FIGS. 16 and 17 illustrate a procedure example of specific processing to be executed in a case where the difference in reaction force characteristic according to the type of the object is expressed.

FIG. 16 illustrates a procedure example of processing to be executed by the CPU 11 of the control device 1.

A difference from the processing illustrated in FIG. 14 is that a process of step S120 is added.

In this case, in response to the instruction of the reaction force instruction mode in step S110, the CPU 11 executes a process of instructing the torque characteristic information according to the type of the virtual object VO to the control unit 35 in step S120, and advances the processing to step S111. Specifically, in the process of step S120, the torque characteristic information of the motor 27 corresponding to the type of the virtual object VO for which the separation distance D is determined to be equal to or less than the threshold d3 is instructed to the control unit 35. Specifically, the torque characteristic information is transmitted to the control unit 35.

Note that the order in which the process of step S120 and the process of step S110 are executed may be changed.

FIG. 17 illustrates a procedure example of processing to be executed by the control unit 35 in a case where the reaction force application mode is instructed.

A difference from the processing illustrated in FIG. 15 D is that a process of step S220 is executed instead of the process of step S208. In step S220, the control unit 35 performs a process of offsetting the motor driving amount on the basis of the instructed torque characteristic information and the separation distance D.

Here, the torque characteristic information in the present example is information indicating a correspondence relationship between the absolute value of the separation distance D and the offset value of the motor driving amount (that is, the torque of the motor 27). In the process of step S220, an offset value corresponding to the absolute value of the separation distance D acquired in step S207 is acquired on the basis of such torque characteristic information, and the offset value is added to the motor driving amount set in step S205.

By the processing illustrated in FIGS. 16 and 17, it is possible to express the difference in reaction force characteristic according to the type of the object. In other words, it is possible to express the difference in elasticity according to the type of the object.

Note that, in the above description, as an example in which the CPU 11 instructs the torque characteristic information according to the type of the virtual object VO to the control unit 35, an example in which the CPU 11 transmits the torque characteristic information has been described. However, it is also possible to adopt a method in which the torque characteristic information for every type of the virtual object VO is stored in the control unit 35 side, and the CPU 11 transmits information for identifying the type of the virtual object VO to the control unit 35. In this case, it is not necessary to store the torque characteristic information in the control device 1 side.

Here, in the above description, an example has been described in which a method of winding the wire 21 by the pulley 29 is adopted in order to perceive the sensation of touching the object and the reaction force from the object. However, instead of this, for example, a method as a linear motion type as illustrated in FIG. 18 can also be adopted.

Figure 18:
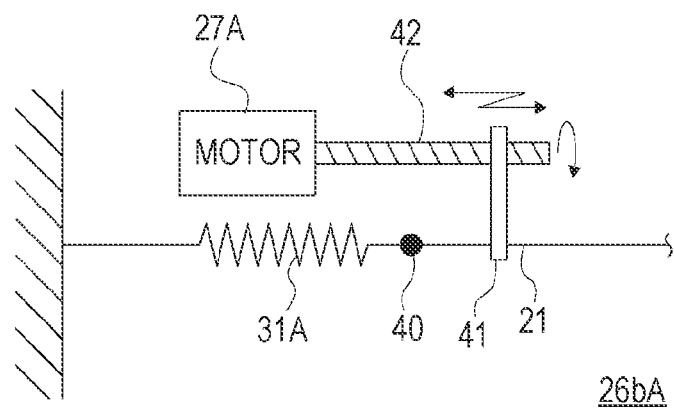
FIG. 18 is a diagram schematically illustrating a configuration example of an internal structure in a linear motion type wire control part.

FIG. 18 schematically illustrates a configuration example of an internal structure 26bA of the wire control part 26 in a case where the linear motion type is adopted.

Although not illustrated, also in this case, one end of the wire 21 is locked by the locking unit 22. In this case, the other end of the wire 21 is fixed to an urging unit 31A provided in the internal structure 26bA. As the urging unit 31A, for example, a coil spring is used, the other end of the wire 21 is fixed to one end of the spring, and the other end of the spring is fixed to a member supported by the pedestal portion 25. Here, similarly to the urging unit 31, the urging unit 31A is provided to maintain the tension of the wire 21, and the urging force is reduced.

A wire-side stopper 40 is fixed to the other end portion of the wire 21. The wire-side stopper 40 is displaced mechanically in conjunction with the displacement of the wire 21 in the unwinding direction and the displacement in the pulling direction according to the bending and stretching of the finger.

In the internal structure 26bA, a drive part-side stopper 41 positioned closer to one end side (fingertip side) of the wire 21 than the wire-side stopper 40 is provided on the track of such the wire-side stopper 40 which is displaced in conjunction with the displacement of the wire 21 in the unwinding direction and the pulling direction. The drive part-side stopper 41 is displaceable in a direction parallel to the displacement direction of the wire-side stopper 40 by a feed screw 42 rotationally driven by a motor 27A. That is, the drive part-side stopper 41 is displaceable in a direction of coming into contact with and separating from the wire-side stopper 40.

FIG. 19 is an explanatory diagram of the idling mode, the preparation mode, the contact reproduction mode, and the reaction force application mode in the case of using such a linear motion type wire control part 26.

In the idling mode illustrated in FIG. 19A, the drive part-side stopper 41 is positioned at a predetermined retraction position by the motor 27A, and in the preparation mode illustrated in FIG. 19B, the drive part-side stopper 41 is driven by the motor 27A to follow the wire-side stopper 40 with a constant interval.

Furthermore, in the contact reproduction mode illustrated in FIG. 19C, the drive part-side stopper 41 is driven to come into contact with the wire-side stopper 40. Specifically, the drive part-side stopper 41 is driven by the motor 27A with the position in contact with the wire-side stopper 40 set as the target position. In the reaction force mode illustrated in FIG. 19D, the drive part-side stopper 41 is driven by the motor 27A to apply a reaction force (a force for displacing the wire 21 in the pulling direction) to the wire-side stopper 40.

Even in the case of using such a linear motion type wire control part 26, it is possible to obtain the effect similar to the case of using the winding-type wire control part 26 using the pulley 29 described above.

Note that, in the above description, an example has been described in which the force sense presentation is performed for only one finger among a plurality of fingers possessed by the user. However, similar force sense presentation can be realized for a plurality of fingers by adopting a similar method for other fingers.

Furthermore, in the above description, an example has been described in which a motor is used as a drive source of the drive part-side stopper 30a (or 41), but an actuator other than the motor, for example, an actuator, such as an air cylinder type actuator, using a pressure of a fluid can also be used as the drive source.

Furthermore, in the above description, a configuration has been exemplified in which the wire 21 is arranged along the back side of the finger, but a configuration can also be adopted in which the wire 21 is arranged along the ball or pad side (a side opposite to the back side) of the finger. Therefore, when the drive part-side stopper 30a (or 41) is brought into contact with the wire-side stopper 29a (or 40) and a force is applied, a force in a direction of bending the finger to the ball or pad side can be generated. Therefore, it is possible to suitably reproduce a force sense when the object is touched from the back side of the finger.

Furthermore, it is also conceivable that the force sense presentation apparatus 2 has various safety functions.

For example, the control unit 35 can detect the torque of the motor 27 (or 27A) (that is, the driving torque of the drive part-side stopper 30a or 41) in the reaction force application mode, and stop the driving of the motor 27 to stop the application of the reaction force to the wire-side stopper 29a (or 40) by the drive part-side stopper 30a (or 41) in a case where the torque reaches a predetermined upper limit value.

Therefore, it is possible to prevent that an excessive load is applied to the joint part of the user for moving the target part or the drive mechanism portion of the drive part-side stopper 30a (or 41).

Therefore, it is possible to prevent excessive stress from being applied to the joint part of the user and prevent the force sense presentation apparatus from being damaged, and it is possible to enhance safety.

Alternatively, it is also possible to adopt a configuration in which the wire is not pulled in more than a predetermined amount.

For example, the control unit 35 estimates the pull-in amount of the wire 21 on the basis of the detection information of the position sensor 32. Then, the control unit 35 controls the motor 27 (or 27A) so that the thus estimated pull-in amount of the wire 21 does not exceed a predetermined amount. Specifically, the driving of the motor 27 (or 27A) is stopped in response to the pull-in amount of the wire 21 reaching a predetermined upper limit value.

Alternatively, it is also possible to adopt a configuration in which a stopper is mechanically provided at a position serving as a pull-in limit, and the stopper prevents the wire-side stopper 29a (or 40) from being displaced in the pull-in direction beyond the limit of the pull-in amount.

For example, when a configuration in which the pull-in amount of the wire 21 does not exceed the predetermined amount is adopted as in these configurations, it is possible to restrict the pull-in amount of the wire 21 so as not to exceed a movable range of the joint part of the user for moving the target part and a movable range of the drive mechanism portion of the drive part-side stopper 30a (or 41).

Therefore, it is possible to prevent excessive stress from being applied to the joint part of the user and prevent the force sense presentation apparatus from being damaged, and it is possible to enhance safety.

Furthermore, the present technology can be applied not only to the finger but also to other parts such as a toe, an elbow, and a knee, for example.

Moreover, the present technology can also be applied to a VR system for rehabilitation in fields of medical care, nursing care, and the like.

Furthermore, in the above description, an example has been described in which the control device which generates the virtual space image and controls the force sense presentation apparatus is configured separately from the HMD which displays the virtual space image, but the control device can also be configured integrally with the HMD. Furthermore, as in the finger recognition device 4, the HMD at this time may have a configuration for realizing a function of recognizing (for example, recognizing the position of each predetermined part configuring the target part) the position and posture of the target part of the force sense presentation.

7. Program and Storage Medium

Although the control device 1 according to the embodiment has been described above, the program of the embodiment is a program for causing a computer device such as a CPU to execute processing as the control device 1.

A program according to the embodiment is a program which is readable by a computer device. The program causes the computer device to execute a process including: causing, as control processing for a force sense presentation apparatus that includes a first member that is displaced mechanically in conjunction with a motion of a target part of a user, a second member that is displaceable in a direction of coming into contact with or separating from the first member, and a drive part that drives the second member and performs force sense presentation with respect to the target part, the drive part to change a driving state of the second member according to a positional relationship between a virtual object and the target part in a virtual space in which the virtual object is arranged.

That is, this program corresponds to, for example, a program for causing the computer device to execute the processing described with reference to FIGS. 14 and 16, and the like.

Such a program can be stored in advance in a storage medium readable by the computer device such as a ROM, a solid state drive (SSD), or a hard disk drive (HDD). Alternatively, furthermore, the program can be temporarily or permanently stored in a removable storage medium such as a semiconductor memory, a memory card, an optical disk, a magneto-optical disk, or a magnetic disk. Furthermore, such a removable storage medium can be provided as so-called package software.

Furthermore, such a program can be installed from the removable storage medium to a personal computer or the like, or can be downloaded from a download site to a required information processing apparatus such as a smartphone via a network such as a local area network (LAN) or the Internet.

8. Summary of Embodiment

As described above, a control device (1) according to the embodiment includes: a control unit (CPU 11) that controls a force sense presentation apparatus (2), which includes a first member (wire-side stopper 29a or 40) that is displaced mechanically in conjunction with a motion of a target part of a user, a second member (drive part-side stopper 30a or 41) that is displaceable in a direction of coming into contact with or separating from the first member, and a drive part (motor 27 or 27A) that drives the second member and performs force sense presentation with respect to the target part, such that a driving state of the second member is changed according to a positional relationship between a virtual object (VO) and the target part in a virtual space (VS) in which the virtual object is arranged.

By changing the driving state of the second member according to the positional relationship between the virtual object and the target part as described above, for example, when the target part approaches and touches the virtual object, the second member can be brought into contact with the first member to allow the user to perceive a sensation of touching the virtual object, or in a state where the target part is sufficiently far from the virtual object, the second member can be driven such that a clearance between the second member and the first member increases, thereby preventing that the second member comes into contact with the first member to hinder the free motion of the target part. Furthermore, when the driving state of the second member is changed according to the positional relationship between the virtual object and the target part as described above, a reaction force from the virtual object side can be applied to the first member so that it is possible to perceive not only the sensation of touching the object but also the reaction force of the object which pushes back the target part from the touched object.

Therefore, it is possible to improve the accuracy of force sense presentation while preventing the hindrance to the free motion of the target part when the user does not touch the virtual object.

Furthermore, in the control device according to the embodiment, the control unit causes the driving state to change according to a separation distance (D) between the virtual object and the target part.

Therefore, it is not necessary to estimate the magnitude of the force applied to the virtual object by the target part in expressing the sensation of touching the object or the reaction force from the object. In the conventional force sense presentation, in order to estimate the magnitude of the force applied to the virtual object by the target part, a method is generally adopted in which a torque in a case where the user moves the target part is detected and a reaction force corresponding to the detected torque is applied to the target part, but in this case, for example it is necessary to additionally provide a sensor for detecting the torque, which leads to a complicated configuration. When the control according to the separation distance from the virtual object is performed as described above, it is not necessary to additionally provide a sensor for torque detection, and it is possible to simplify the configuration for realizing force sense presentation.

Furthermore, when the driving state is changed according to the separation distance between the virtual object and the target part as described above, it is possible to prevent that the free motion of the target part is hindered at a stage before the contact (virtual contact) with the virtual object.

Moreover, in the control device according to the embodiment, the control unit controls the second member to be continuously positioned at a predetermined position separated from the first member in a case where the separation distance is larger than a threshold (threshold d1) (see the "idling mode").

Therefore, in a state where the target part is sufficiently separated from the virtual object in the virtual space, the second member can be continuously positioned at the retraction position sufficiently separated from the first member. That is, it is possible to prevent that the first member which is displaced in conjunction with the target part comes into contact with the second member to hinder the motion of the target part.

Therefore, it is possible to prevent that the motion of the target part is erroneously restricted even when the target part is separated from the virtual object, and it is possible to improve the accuracy of force sense presentation.

Furthermore, it is possible to prevent that the free motion of the target part is hindered at a stage before the contact (virtual contact) with the virtual object.

Furthermore, in the control device according to the embodiment, the control unit estimates the presence or absence of contact of the target part with the virtual object on the basis of the separation distance, and controls the second member to be brought into contact with the first member in a case where it is estimated that the contact has been made (see the "contact reproduction mode").

Therefore, in response to the estimation that the target part has come into contact with the virtual object in the virtual space, a drag expressing the contact with the object can be applied to the target part.

Therefore, according to the contact (virtual contact) with the virtual object, it is possible to allow the user to perceive the sensation of touching the object.

Furthermore, in the control device according to the embodiment, the control unit controls the second member to be driven such that the second member follows the first member at a constant interval until it is estimated that the contact has been made after the separation distance becomes equal to or less than the threshold (see the "preparation mode").

Therefore, in a case where the target part approaches the virtual object in the virtual space and the contact with the virtual object is predicted, the position of the second member can be kept close to the first member.

Therefore, in a case where it is estimated that the contact (virtual contact) with the virtual object has been made, the second member can be quickly brought into contact with the first member, and the accuracy of force sense presentation can be improved in terms of improving the responsiveness of force sense presentation at the time of virtual contact.

Furthermore, it is possible to prevent that the motion of the target part is erroneously restricted even when the target part is separated from the virtual object, and it is possible to improve the accuracy of force sense presentation also in this aspect.

Moreover, in the control device according to the embodiment, the control unit controls the second member to be driven to apply a reaction force to the first member in a case where the separation distance decreases from a time point at which it is estimated that the contact has been made (see the "reaction force application mode").

Therefore, it is possible to express the reaction force from the object when the touched object is further pushed.

Therefore, it is possible to perceive not only the sensation of touching the object but also the reaction force when the object is pushed in, and it is possible to improve the accuracy of the force sense presentation.

Furthermore, in the control device according to the embodiment, the control unit controls the application characteristic of the reaction force to the first member to be changed according to the type of the virtual object (see FIG. 15D).

Therefore, the application characteristic of the reaction force to the target part when the touched object is further pushed is changed according to the type of the virtual object.

Therefore, it is possible to express the difference in elasticity according to the type of the object.

Furthermore, a force sense presentation apparatus (2) according to the embodiment includes: a first member (wire-side stopper 29a or 40) that is displaced mechanically in conjunction with a motion of a target part of a user; a second member (drive part-side stopper 30a or 41) that is displaceable in a direction of coming into contact with or separating from the first member; and a drive part (motor 27 or 27A) that drives the second member. A driving state of the second member by the drive part changes according to a positional relationship between a virtual object (VO) and the target part in a virtual space (VS) in which the virtual object is arranged.

By changing the driving state of the second member according to the positional relationship between the virtual object and the target part as described above, for example, when the target part approaches and touches the virtual object, the second member can be brought into contact with the first member to allow the user to perceive a sensation of touching the virtual object, or in a state where the target part is sufficiently far from the virtual object, the second member can be driven such that a clearance between the second member and the first member increases, thereby preventing that the second member comes into contact with the first member to hinder the free motion of the target part. Furthermore, when the driving state of the second member is changed according to the positional relationship between the virtual object and the target part as described above, a reaction force from the virtual object side can be applied to the first member so that it is possible to perceive not only the sensation of touching the object but also the reaction force of the object which pushes back the target part from the touched object.

Therefore, it is possible to improve the accuracy of force sense presentation while preventing the hindrance to the free motion of the target part when the user does not touch the virtual object.

Furthermore, in the force sense presentation apparatus according to the embodiment, the driving state changes according to the separation distance between the virtual object and the target part.

Therefore, it is not necessary to estimate the magnitude of the force applied to the virtual object by the target part in expressing the sensation of touching the object or the reaction force from the object.

Therefore, the configuration for realizing the force sense presentation can be simplified.

Furthermore, when the driving state is changed according to the separation distance between the virtual object and the target part as described above, it is possible to prevent that the free motion of the target part is hindered at a stage before the contact (virtual contact) with the virtual object.

Moreover, in the force sense presentation apparatus according to the embodiment, the drive part continuously positions the second member at a predetermined position separated from the first member in a case where the separation distance is larger than a threshold (see the "idling mode").

Therefore, in a state where the target part is sufficiently separated from the virtual object in the virtual space, the second member can be continuously positioned at the predetermined retraction position sufficiently separated from the first member. That is, it is possible to prevent that the first member which is displaced in conjunction with the target part comes into contact with the second member to hinder the motion of the target part.

Therefore, it is possible to prevent that the motion of the target part is erroneously restricted even when the target part is separated from the virtual object, and it is possible to improve the accuracy of force sense presentation.

Furthermore, it is possible to prevent that the free motion of the target part is hindered at a stage before the contact (virtual contact) with the virtual object.

Furthermore, in the force sense presentation apparatus according to the embodiment, the drive part brings the second member into contact with the first member in a case where it is estimated on the basis of the separation distance that contact of the target part with the virtual object has been made ("contact reproduction mode").

Therefore, in response to the estimation that the target part has come into contact with the virtual object in the virtual space, a drag expressing the contact with the object can be applied to the target part.

Therefore, according to the contact (virtual contact) with the virtual object, it is possible to allow the user to perceive the sensation of touching the object.

Furthermore, in the force sense presentation apparatus according to the embodiment, the drive part drives the second member such that the second member follows the first member at a constant interval until it is estimated that the contact has been made after the separation distance becomes equal to or less than the threshold (see the "preparation mode").

Therefore, in a case where the target part approaches the virtual object in the virtual space and the contact with the virtual object is predicted, the position of the second member can be kept close to the first member.

Therefore, in a case where it is estimated that the contact (virtual contact) with the virtual object has been made, the second member can be quickly brought into contact with the first member, and the accuracy of force sense presentation can be improved in terms of improving the responsiveness of force sense presentation at the time of virtual contact.

Furthermore, it is possible to prevent that the motion of the target part is erroneously restricted even when the target part is separated from the virtual object, and it is possible to improve the accuracy of force sense presentation also in this aspect.

Moreover, in the force sense presentation apparatus according to the embodiment, the drive part drives the second member to apply a reaction force to the first member in a case where the separation distance decreases from a time point at which it is estimated that the contact has been made ("reaction force application mode").

Therefore, it is possible to express the reaction force from the object when the touched object is further pushed.

Therefore, it is possible to perceive not only the sensation of touching the object but also the reaction force when the object is pushed in, and it is possible to improve the accuracy of the force sense presentation.

Furthermore, in the force sense presentation apparatus according to the embodiment, the drive part changes an application characteristic of the reaction force to the first member according to a type of the virtual object (see FIG. 17).

Therefore, the application characteristic of the reaction force to the target part when the touched object is further pushed is changed according to the type of the virtual object.

Therefore, it is possible to express the difference in elasticity according to the type of the object.

Furthermore, in the force sense presentation apparatus according to the embodiment, the target part is a finger of the user.

Therefore, with the finger of the user as a target, the drag or the reaction force from the virtual object can be applied according to the positional relationship with the virtual object.

Therefore, it is possible to express a force sense when the user picks or grasps an object.

Moreover, the force sense presentation apparatus according to the embodiment includes: a wire (21) that is interlocked with a motion of the target part, and the first member is a member that is mechanically interlocked with the wire.

Therefore, in a case where the second member comes into contact with the first member or applies the reaction force to the first member, the drag or the reaction force is applied to the target part via the wire. With such a wire-type force sense presentation apparatus, members to be arranged on the target part such as a finger in the force sense presentation can be only a locking unit that locks one end of the wire and a guide unit that allows the wire to creep along the target part.

Therefore, it is possible to prevent that the silhouette of the target part is disturbed, and it is possible to improve the accuracy of force sense presentation in terms of improving the detection accuracy of the position of the target part, that is, improving the recognition accuracy of the positional relationship between the target part and the virtual object.

Furthermore, since the members to be arranged on the target part in the force sense presentation are simplified as described above, it is possible to prevent that the force sense presentation apparatus hinders the motion of the target part, and it is possible to enhance the user's sense of immersion in the virtual space.

Furthermore, in the force sense presentation apparatus according to the embodiment, the target part is a finger of the user, and the wire is arranged along a back of the finger.

Therefore, when the second member is brought into contact with the first member to apply a force, it is possible to generate a force in a direction in which the finger is warped to the back side (a direction in which the finger is stretched).

Therefore, the force sense presentation apparatus is suitable for force sense presentation when picking or gripping an object.

Furthermore, in the force sense presentation apparatus according to an embodiment, the drive part is arranged on a fingertip side or an arm side of a wrist of the user.

Therefore, the drive part is arranged not to straddle the wrist of the user.

Therefore, it is possible to prevent hindrance to the motion of the hand of the user, and it is possible to enhance the user's sense of immersion in the virtual space.

Moreover, in the force sense presentation apparatus according to the embodiment, the drive part stops application of a reaction force of the second member to the first member in a case where a driving torque of the second member reaches an upper limit value.

Therefore, it is possible to prevent that an excessive load is applied to the joint part of the user for moving the target part or the drive mechanism portion of the second member.

Therefore, it is possible to prevent excessive stress from being applied to the joint part of the user and prevent the force sense presentation apparatus from being damaged, and it is possible to enhance safety.

Moreover, the force sense presentation apparatus according to the embodiment includes: a wire that is interlocked with a motion of the target part. The first member is a member that is mechanically interlocked with the wire, and a pull-in amount of the wire does is configured not to exceed a predetermined amount.

Therefore, it is possible to restrict the pull-in amount of the wire not to exceed a movable range of the joint part of the user for moving the target part or a movable range of the drive mechanism portion of the second member.

Therefore, it is possible to prevent excessive stress from being applied to the joint part of the user and prevent the force sense presentation apparatus from being damaged, and it is possible to enhance safety.

Furthermore, a control method according to the embodiment is a method of controlling a force sense presentation apparatus that includes a first member that is displaced mechanically in conjunction with a motion of a target part of a user, a second member that is displaceable in a direction of coming into contact with or separating from the first member, and a drive part that drives the second member and performs force sense presentation with respect to the target part. The method includes: causing a driving state of the second member to change according to a positional relationship between a virtual object and the target part in a virtual space in which the virtual object is arranged.

Also with such a control method according to the embodiment, it is also possible to obtain functions and effects similar to those of the above-described control device and force sense presentation apparatus according to the embodiment.

Furthermore, a storage medium according to the embodiment is a storage medium having stored therein a program which is readable by a computer device. The program causes the computer device to execute a process including: causing, as control processing for a force sense presentation apparatus that includes a first member that is displaced mechanically in conjunction with a motion of a target part of a user, a second member that is displaceable in a direction of coming into contact with or separating from the first member, and a drive part that drives the second member and performs force sense presentation with respect to the target part, the drive part to change a driving state of the second member according to a positional relationship between a virtual object and the target part in a virtual space in which the virtual object is arranged.

With such a storage medium, it is possible to facilitate implementation of the above-described control device according to the embodiment.

Note that the effects described in this description are merely examples and are not limited, and other effects may be provided.

9. Present Technology

Note that the present technology can also adopt the following configurations.

(1)
A control device including:
a control unit that controls a force sense presentation apparatus, which includes a first member that is displaced mechanically in conjunction with a motion of a target part of a user, a second member that is displaceable in a direction of coming into contact with or separating from the first member, and a drive part that drives the second member and performs force sense presentation with respect to the target part, such that a driving state of the second member is changed according to a positional relationship between a virtual object and the target part in a virtual space in which the virtual object is arranged.

(2)
The control device according to (1), in which
the control unit
causes the driving state to change according to a separation distance between the virtual object and the target part.

(3)
The control device according to (2), in which
the control unit
controls the second member to be continuously positioned at a predetermined position separated from the first member in a case where the separation distance is larger than a threshold.

(4)
The control device according to (3), in which
the control unit
estimates presence or absence of contact of the target part with the virtual object on the basis of the separation distance, and controls the second member to be brought into contact with the first member in a case where it is estimated that the contact has been made.

(5)
The control device according to (4), in which
the control unit
controls the second member to be driven such that the second member follows the first member at a constant interval until it is estimated that the contact has been made after the separation distance becomes equal to or less than the threshold.

(6)
The control device according to (4) or (5), in which
the control unit
controls the second member to be driven to apply a reaction force to the first member in a case where the separation distance decreases from a time point at which it is estimated that the contact has been made.

(7)
The control device according to (6), in which
the control unit
controls an application characteristic of the reaction force to the first member to be changed according to a type of the virtual object.

(8)
A force sense presentation apparatus including:
a first member that is displaced mechanically in conjunction with a motion of a target part of a user;
a second member that is displaceable in a direction of coming into contact with or separating from the first member; and
a drive part that drives the second member, in which
a driving state of the second member by the drive part changes according to a positional relationship between a virtual object and the target part in a virtual space in which the virtual object is arranged.

(9)
The force sense presentation apparatus according to (8), in which
the driving state changes according to a separation distance between the virtual object and the target part.

(10)
The force sense presentation apparatus according to (9), in which
the drive part continuously positions the second member at a predetermined position separated from the first member in a case where the separation distance is larger than a threshold.

(11)
The force sense presentation apparatus according to (10), in which
the drive part
brings the second member into contact with the first member in a case where it is estimated on the basis of the separation distance that contact of the target part with the virtual object has been made.

(12)
The force sense presentation apparatus according to (11), in which
the drive part
drives the second member such that the second member follows the first member at a constant interval until it is estimated that the contact has been made after the separation distance becomes equal to or less than the threshold.

(13)
The force sense presentation apparatus according to (11) or (12), in which
the drive part
drives the second member to apply a reaction force to the first member in a case where the separation distance decreases from a time point at which it is estimated that the contact has been made.

(14)
The force sense presentation apparatus according to (13), in which
the drive part
changes an application characteristic of the reaction force to the first member according to a type of the virtual object.

(15)
The force sense presentation apparatus according to any one of (8) to (14), in which
the target part is a finger of the user.

(16)
The force sense presentation apparatus according to any one of (8) to (16), further including:
a wire that is interlocked with a motion of the target part, in which
the first member is a member that is mechanically interlocked with the wire.

(17)
The force sense presentation apparatus according to (16), in which
the target part is a finger of the user, and
the wire is arranged along a back of the finger.

(18)
The force sense presentation apparatus according to any one of (15) to (17), in which
the drive part is arranged on a fingertip side or an arm side of a wrist of the user.

(19)
The force sense presentation apparatus according to any one of (8) to (18), in which
the drive part
stops application of a reaction force of the second member to the first member in a case where a driving torque of the second member reaches an upper limit value.

(20)
The force sense presentation apparatus according to any one of (8) to (19), further including:
a wire that is interlocked with a motion of the target part, in which
the first member is a member that is mechanically interlocked with the wire, and
a pull-in amount of the wire does not exceed a predetermined amount.

(21)
A method of controlling a force sense presentation apparatus that includes a first member that is displaced mechanically in conjunction with a motion of a target part of a user, a second member that is displaceable in a direction of coming into contact with or separating from the first member, and a drive part that drives the second member and performs force sense presentation with respect to the target part, the method including:
causing a driving state of the second member to change according to a positional relationship between a virtual object and the target part in a virtual space in which the virtual object is arranged.

(22)
A storage medium having stored therein a program which is readable by a computer device, the program causing the computer device to execute a process including:
causing, as control processing for a force sense presentation apparatus that includes a first member that is displaced mechanically in conjunction with a motion of a target part of a user, a second member that is displaceable in a direction of coming into contact with or separating from the first member, and a drive part that drives the second member and performs force sense presentation with respect to the target part, the drive part to change a driving state of the second member according to a positional relationship between a virtual object and the target part in a virtual space in which the virtual object is arranged.

REFERENCE SIGNS LIST

1 Control device
2 Force sense presentation apparatus
4 Finger recognition device
11 CPU
20 Globe unit
21 Wire
22 Locking unit
23 Guide member
23a, 23b, 25a Guide hole
24 Wire control unit
25 Pedestal portion
26 Wire control part
26a Case
26b, 26bA Internal structure
27, 27A Motor
27a Rotation shaft
28 Holding unit
29 Pulley
29a, 40 Wire-side stopper
30 Rotation unit
30a, 41 Drive part-side stopper
31, 31A Urging unit
32 Position sensor
33 Cover unit
35 Control unit
42 Feed screw VS Virtual space
VO Virtual object
VH Virtual hand

The invention claimed is:

1. A control device comprising:
a control unit configured to control a force sense presentation apparatus, which includes a first member that is displaced mechanically in conjunction with a motion of a target part of a user, a second member that is displaceable in a direction of coming into contact with or separating from the first member, and a motor configured to drive the second member and perform force sense presentation with respect to the target part, such that the motor changes a driving state of the second member is changed according to a positional relationship between a virtual object and the target part in a virtual space in which the virtual object is arranged, wherein
the control unit is implemented via at least one processor.

2. A control device comprising:
a control unit configured to
control a force sense presentation apparatus, which includes a first member that is displaced mechanically in conjunction with a motion of a target part of a user, a second member that is displaceable in a direction of coming into contact with or separating from the first member, and a motor configured to drive the second member and perform force sense presentation with respect to the target part, such that a driving state of the second member is changed according to a positional relationship between a virtual object and the target part in a virtual space in which the virtual object is arranged, wherein
the control unit causes the driving state to change according to a separation distance between the virtual object and the target part, and
the control unit is implemented via at least one processor.

3. The control device according to claim 2, wherein
the control unit is further configured to control the second member to be continuously positioned at a predetermined position separated from the first member in a case where the separation distance is larger than a threshold.

4. The control device according to claim 3, wherein
the control unit is further configured to estimate presence or absence of contact of the target part with the virtual object on a basis of the separation distance, and control the second member to be brought into contact with the first member in a case where it is estimated that the contact has been made.

5. The control device according to claim 4, wherein
the control unit is further configured to control the second member to be driven such that the second member follows the first member at a constant interval until it is estimated that the contact has been made after the separation distance becomes equal to or less than the threshold.

6. The control device according to claim 4, wherein
the control unit is further configured to control the second member to be driven to apply a reaction force to the first member in a case where the separation distance decreases from a time point at which it is estimated that the contact has been made.

7. The control device according to claim 6, wherein
the control unit is further configured to control an application characteristic of the reaction force to the first member to be changed according to a type of the virtual object.

8. A force sense presentation apparatus comprising:
a first member that is displaced mechanically in conjunction with a motion of a target part of a user;
a second member that is displaceable in a direction of coming into contact with or separating from the first member; and
a motor configured to drive the second member, wherein
the motor is further configured to change a driving state of the second member according to a positional relationship between a virtual object and the target part in a virtual space in which the virtual object is arranged.

9. A force sense presentation apparatus comprising:
a first member that is displaced mechanically in conjunction with a motion of a target part of a user;
a second member that is displaceable in a direction of coming into contact with or separating from the first member; and
a motor configured to drive the second member, wherein
a driving state of the second member is changed by the motor according to a positional relationship between a virtual object and the target part in a virtual space in which the virtual object is arranged, and
the driving state changes according to a separation distance between the virtual object and the target part.

10. The force sense presentation apparatus according to claim 9, wherein
the motor is further configured to continuously position the second member at a predetermined position separated from the first member in a case where the separation distance is larger than a threshold.

11. The force sense presentation apparatus according to claim 10, wherein
the motor is further configured to bring the second member into contact with the first member in a case where it is estimated on a basis of the separation distance that contact of the target part with the virtual object has been made.

12. The force sense presentation apparatus according to claim 11, wherein
the motor is further configured to drive the second member such that the second member follows the first member at a constant interval until it is estimated that the contact has been made after the separation distance becomes equal to or less than the threshold.

13. The force sense presentation apparatus according to claim 11, wherein
the motor is further configured to drive the second member to apply a reaction force to the first member in a case where the separation distance decreases from a time point at which it is estimated that the contact has been made.

14. The force sense presentation apparatus according to claim 13, wherein
the motor is further configured to change an application characteristic of the reaction force to the first member according to a type of the virtual object.

15. The force sense presentation apparatus according to claim 8, wherein
the target part is a finger of the user.

16. The force sense presentation apparatus according to claim 8, further comprising:
    a wire that is interlocked with a motion of the target part, wherein
    the first member is a member that is mechanically interlocked with the wire.

17. The force sense presentation apparatus according to claim 16, wherein
    the target part is a finger of the user, and
    the wire is arranged along a back of the finger.

18. The force sense presentation apparatus according to claim 15, wherein
    the motor is arranged on a fingertip side or an arm side of a wrist of the user.

19. The force sense presentation apparatus according to claim 8, wherein
    the motor is further configured to stop application of a reaction force of the second member to the first member in a case where a driving torque of the second member reaches an upper limit value.

20. The force sense presentation apparatus according to claim 8, further comprising:
    a wire that is interlocked with a motion of the target part, wherein
    the first member is a member that is mechanically interlocked with the wire, and
    a pull-in amount of the wire does not exceed a predetermined amount.

21. A method of controlling a force sense presentation apparatus that includes a first member that is displaced mechanically in conjunction with a motion of a target part of a user, a second member that is displaceable in a direction of coming into contact with or separating from the first member, and a motor configured to drive the second member and perform force sense presentation with respect to the target part, the method comprising:
    causing the motor to change a driving state of the second member according to a positional relationship between a virtual object and the target part in a virtual space in which the virtual object is arranged.

* * * * *